United States Patent
Chen et al.

(10) Patent No.: US 9,160,513 B2
(45) Date of Patent: Oct. 13, 2015

(54) METHOD AND APPARATUS FOR SIGNALING CONTROL DATA OF AGGREGATED CARRIERS

(75) Inventors: Wanshi Chen, San Diego, CA (US); Juan Montojo, Nuremberg (DE); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 13/558,962

(22) Filed: Jul. 26, 2012

(65) Prior Publication Data
US 2013/0028149 A1 Jan. 31, 2013

Related U.S. Application Data

(60) Provisional application No. 61/512,825, filed on Jul. 28, 2011.

(51) Int. Cl.
H04W 4/00 (2009.01)
H04B 7/216 (2006.01)
H04L 5/00 (2006.01)

(52) U.S. Cl.
CPC ............... *H04L 5/0058* (2013.01); *H04L 5/001* (2013.01); *H04L 5/0005* (2013.01); *H04L 5/0055* (2013.01); *H04L 5/0057* (2013.01)

(58) Field of Classification Search
CPC ..... H04L 1/007; H04L 1/0073; H04L 1/1671; H04L 5/0048; H04L 5/0053; H04L 5/0057; H04L 5/001; H04L 5/0055; H04W 72/0413
See application file for complete search history.

(56) References Cited

U.S. PATENT DOCUMENTS

| | | | |
|---|---|---|---|
| 8,774,123 B1* | 7/2014 | Baldemair et al. | 370/330 |
| 2010/0197339 A1* | 8/2010 | Pedersen et al. | 455/522 |
| 2011/0038280 A1* | 2/2011 | Jung et al. | 370/254 |
| 2011/0090809 A1* | 4/2011 | Chen et al. | 370/252 |
| 2011/0134774 A1* | 6/2011 | Pelletier et al. | 370/252 |
| 2011/0142075 A1* | 6/2011 | Che et al. | 370/476 |
| 2011/0194501 A1* | 8/2011 | Chung et al. | 370/328 |
| 2011/0211489 A1 | 9/2011 | Chung et al. | |
| 2011/0243012 A1* | 10/2011 | Luo et al. | 370/252 |
| 2011/0243066 A1* | 10/2011 | Nayeb Nazar et al. | 370/328 |
| 2011/0249647 A1* | 10/2011 | Chen et al. | 370/330 |

(Continued)

FOREIGN PATENT DOCUMENTS

JP 2012054711 A 3/2012

OTHER PUBLICATIONS

3GPP TS 36.211, V 9.1.0, Mar. 2010.*

(Continued)

*Primary Examiner* — Melanie Jagannathan
(74) *Attorney, Agent, or Firm* — Novak Druce Connolly Bove + Quigg LLP

(57) ABSTRACT

Techniques are provided for communicating control information for aggregated carriers. For example, a method includes receiving one or more assignments for a plurality of aggregated carriers. For example, the at least one of the plurality of aggregated carriers is a time division duplexing (TDD) carrier having a different subframe configuration than at least another one of the plurality of aggregated carriers. The method may include communicating control information for the plurality of aggregated carriers over one of the plurality of aggregated carriers.

75 Claims, 17 Drawing Sheets

(56) References Cited

U.S. PATENT DOCUMENTS

| | | | |
|---|---|---|---|
| 2011/0261714 A1 | 10/2011 | Pan et al. | |
| 2011/0261776 A1 | 10/2011 | Ahn et al. | |
| 2011/0280164 A1* | 11/2011 | Luo et al. | 370/281 |
| 2011/0310820 A1* | 12/2011 | Liao | 370/329 |
| 2012/0069795 A1 | 3/2012 | Chung et al. | |
| 2012/0069802 A1* | 3/2012 | Chen et al. | 370/329 |
| 2012/0106404 A1 | 5/2012 | Damnjanovic | |
| 2012/0263118 A1* | 10/2012 | Love et al. | 370/329 |
| 2012/0275409 A1* | 11/2012 | Han et al. | 370/329 |
| 2012/0294273 A1* | 11/2012 | Ahn et al. | 370/329 |
| 2013/0003664 A1* | 1/2013 | Frenne et al. | 370/329 |
| 2013/0094466 A1* | 4/2013 | Kim et al. | 370/329 |
| 2014/0334395 A1* | 11/2014 | Lee et al. | 370/329 |

OTHER PUBLICATIONS

Huawei et al., "UCI multiplexing on PUSCH for carrier aggregation", 3GPP Draft; R1-106154, 3rd Generation Partnership Project (3GPP), Mobile Competence Centre ; 650, Route Des Lucioles; F-06921 Sophia-Antipolis Cedex; France, vol. RAN WG1, no. Jacksonville, USA; Nov. 15, 2010, Nov. 9, 2010, XP050489612, [retrieved on Nov. 9, 2010].

Intel Corporation: Support of Mixed Inter-Band TDD Configurations in Re1-11 CAM, 3GPP Draft; R2-113216 Mixed TDD Configurations for Interband CA, 3rd Generation Partnership Project (3GPP), Mobile Competence Centre ; 650, Route Des Lucioles ; F-06921 Sophia-Antipolis Cedex ; France, vol. RAN WG2, no. Barcelona, Spain; May 9, 2011, May 3, 2011, XP050495383, [retrieved on May 31, 2011 the whole document.

International Search Report and Written Opinion—PCT/US2012/048554—ISA/EPO—Jan. 4, 2013.

LG Electronics: "UL CC selection for UCI transmission on PUSCH", 3GPP Draft; R1-106105_UL CC Selection_LGE, 3rd Generation Partnership Project (3GPP), Mobile Competence Centre ; 650, Route Des Lucioles; F-06921 Sophia-Antipolis Cedex; France, vol. RAN WG1, no. Jacksonville, USA; Nov. 15, 2010, Nov. 10, 2010, XP050489780, [retrieved on Nov. 10, 2010].

MCC Support: "Final Report of 3GPP TSG RAN WG1 #61 bis v1.0.0 (Dresden, Germany, Jun. 28-Jul. 2, 2010)", 3GPP Draft; Final_ReportWG1 #61 Bis_V100, 3rd Generation Partnership Project (3GPP), Mobile Competence Centre ; 650, Route Des Lucioles; F-06921 Sophia-Antipolis Cedex; France, vol. RAN WG1, no. Madrid, Spain; Aug. 23, 2010, Aug. 18, 2010, XP050450091, [retrieved on Aug. 18, 2010].

Motorola: "SCell Selection for UCI Multiplexing on PUSCH", 3GPP Draft; R1-110958, 3rd Generation Partnership Project (3GPP), Mobile Competence Centre ; 650, Route Des Lucioles ; F-06921 Sophia-Antipolis Cedex ; France, vol. RAN WG1, no. Taipei, Taiwan; Feb. 21, 2011, Feb. 15, 2011, XP050490684, [retrieved on Feb. 15, 2011].

Partial International Search Report—PCT/US2012/048554—ISA/EPO—Nov. 2, 2012.

Research in Motion et al., "UCI Transmission in the Presence of UL-SCH Data",3GPP Draft; R1-1 04055 (RIM-UCI With UL Data), 3rd Generation Partnership Project (3GPP), Mobile Competence Centre ; 650, Route Des Lucioles ; F-06921 Sophia-Antipolis Ceo ex ; France, vol. RAN WG1, no. Dresden, Germany; Jun. 28, 2010-Jul. 2, 2010, Jun. 22, 2010, XP050598493, [retrieved on Jun. 22, 2010].

"3rd Generation Partnership Project; Technical Specification Group Radio Access Network; Evolved Universal Terrestrial Radio Access (E-UTRA); Physical Channels and Modulation (Release 10)", 3GPP Standard; 3GPP TS 36.211, 3rd Generation Partnership Project (3GPP), Mobile Competence Centre ; 650, Route Des Lucioles ; F-06921 Sophia-Antipolis Cedex ; France, vol. RAN WG1, No. V10.2.0, Jun. 22, 2011, pp. 1-103, XP050553380, [retrieved on Jun. 22, 2011].

CATT: HARQ and Cross-carrier Scheduling for Different TDD, 3GPP TSG RAN WG2 Meeting #74, 3GPP, May 13, 2011, R2-112798.

* cited by examiner

US 9,160,513 B2

METHOD AND APPARATUS FOR SIGNALING CONTROL DATA OF AGGREGATED CARRIERS

The present application for patent claims priority to Provisional Application No. 61/512,825, filed Jul. 28, 2011, entitled "METHOD AND APPARATUS FOR SIGNALING CONTROL DATA OF AGGREGATED CARRIERS", which is assigned to the assignee hereof, and is hereby expressly incorporated in its entirety by reference herein.

BACKGROUND

1. Field

Aspects of the present disclosure relate generally to wireless communication systems and to carrier aggregation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for communicating control data or control information related to aggregated carriers are described herein.

In an aspect, a method for communicating control information for aggregated carriers is provided. The method includes receiving one or more assignments for a plurality of aggregated carriers, wherein at least one of the plurality of aggregated carriers is a time division duplexing (TDD) carrier having a different subframe configuration than at least another one of the plurality of aggregated carriers. The method also includes determining one of the plurality of aggregated carriers over which to communicate control information based at least in part on a subframe availability of the plurality of aggregated carriers. The method also includes communicating via at least one subframe the control information for the plurality of aggregated carriers over the determined one of the plurality of aggregated carriers.

According to another aspect, an apparatus for communicating control information for aggregated carriers is provided. The apparatus includes means for receiving one or more assignments for a plurality of aggregated carriers, wherein at least one of the plurality of aggregated carriers is a time division duplexing (TDD) carrier having a different subframe configuration than at least another one of the plurality of aggregated carriers. The apparatus also includes means for determining one of the plurality of aggregated carriers over which to communicate control information based at least in part on a subframe availability of the plurality of aggregated carriers. The apparatus also includes means for communicating via at least one subframe the control information for the plurality of aggregated carriers over the determined one of the plurality of aggregated carriers.

According to another aspect, a non-transitory computer readable storage medium is provided. The computer readable storage medium includes code for causing a computer to receive one or more assignments for a plurality of aggregated carriers, wherein at least one of the plurality of aggregated carriers is a time division duplexing (TDD) carrier having a different subframe configuration than at least another one of the plurality of aggregated carriers. The computer readable storage medium also includes code for causing the computer to determine one of the plurality of aggregated carriers over which to communicate control information based at least in part on a subframe availability of the plurality of aggregated carriers. The computer readable storage medium also includes code for causing the computer to communicate via at least one subframe the control information for the plurality of aggregated carriers over the determined one of the plurality of aggregated carriers.

According to another aspect, a user equipment (UE) for communicating control information for aggregated carriers is provided. The UE includes at least one processor and a memory coupled to the at least one processor. The at least one processor is configured to receive one or more assignments for a plurality of aggregated carriers, wherein at least one of the plurality of aggregated carriers is a time division duplexing (TDD) carrier having a different subframe configuration than at least another one of the plurality of aggregated carriers. The at least one processor is also configured to determine one of the plurality of aggregated carriers over which to communicate control information based at least in part on a subframe availability of the plurality of aggregated carriers. The at least one processor is also configured to communicate in at least on subframe the control information for the plurality of aggregated carriers over the determined one of the plurality of aggregated carriers.

According to another aspect, a wireless communication device for communicating control information for aggregated carriers is provided. The wireless communication device includes a processor, a memory in electronic communication with the processor, and instructions stored in the memory. The instructions are executable by the processor to receive one or more assignments for a plurality of aggregated carriers, wherein at least one of the plurality of aggregated carriers is a time division duplexing (TDD) carrier having a different subframe configuration than at least another one of the plurality of aggregated carriers. The instructions are also executable by the processor to determine one of the plurality of aggregated carriers over which to communicate control information based at least in part on a subframe availability of the plurality of aggregated carriers. The instructions are also executable by the processor to communicate via at least one subframe the control information for the plurality of aggregated carriers over the determined one of the plurality of aggregated carriers.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
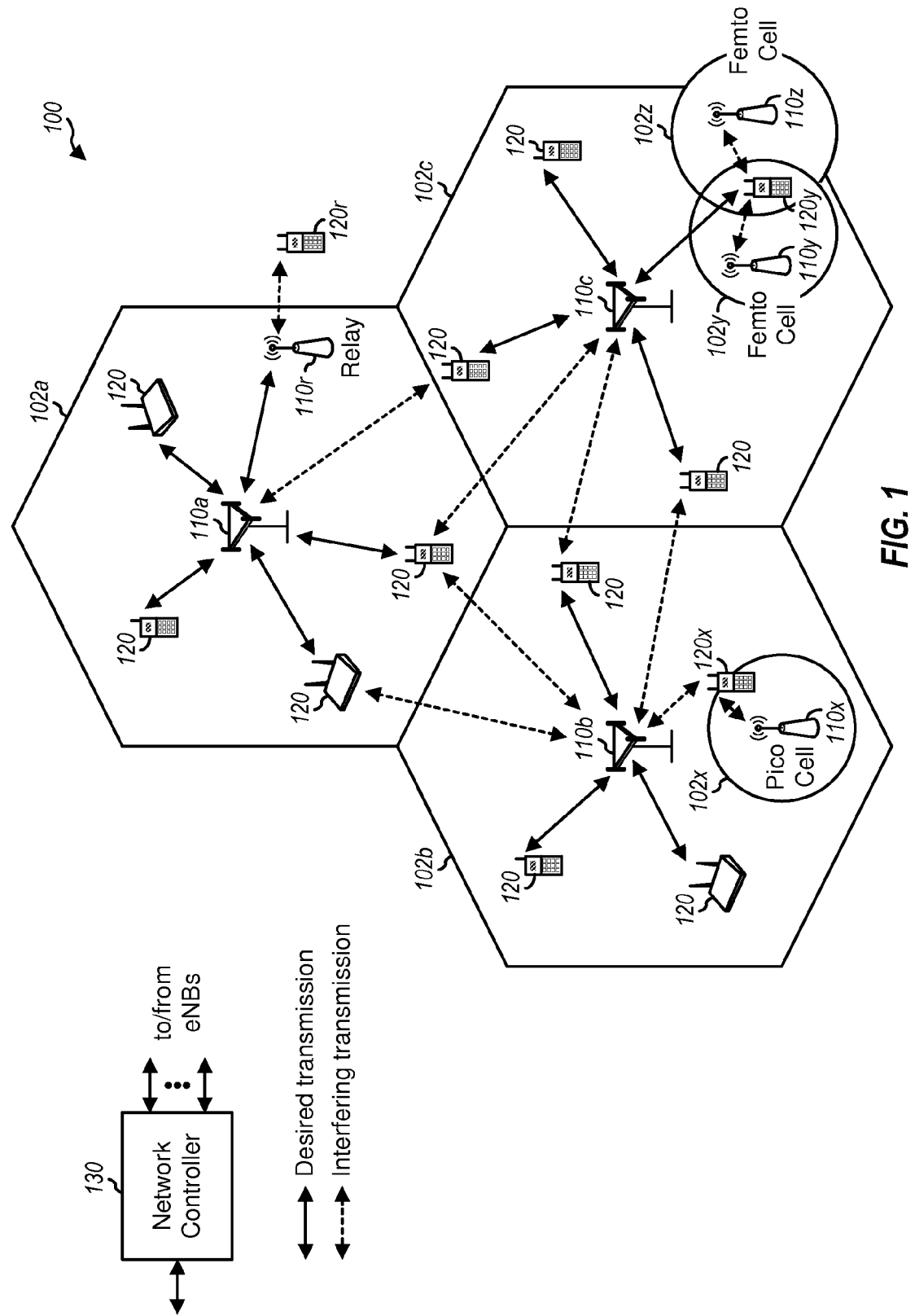
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 5 to 40 Watts) whereas pico eNodeBs, femto eNodeBs and relays may have a lower transmit power level (e.g., 0.1 to 2 Watts).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
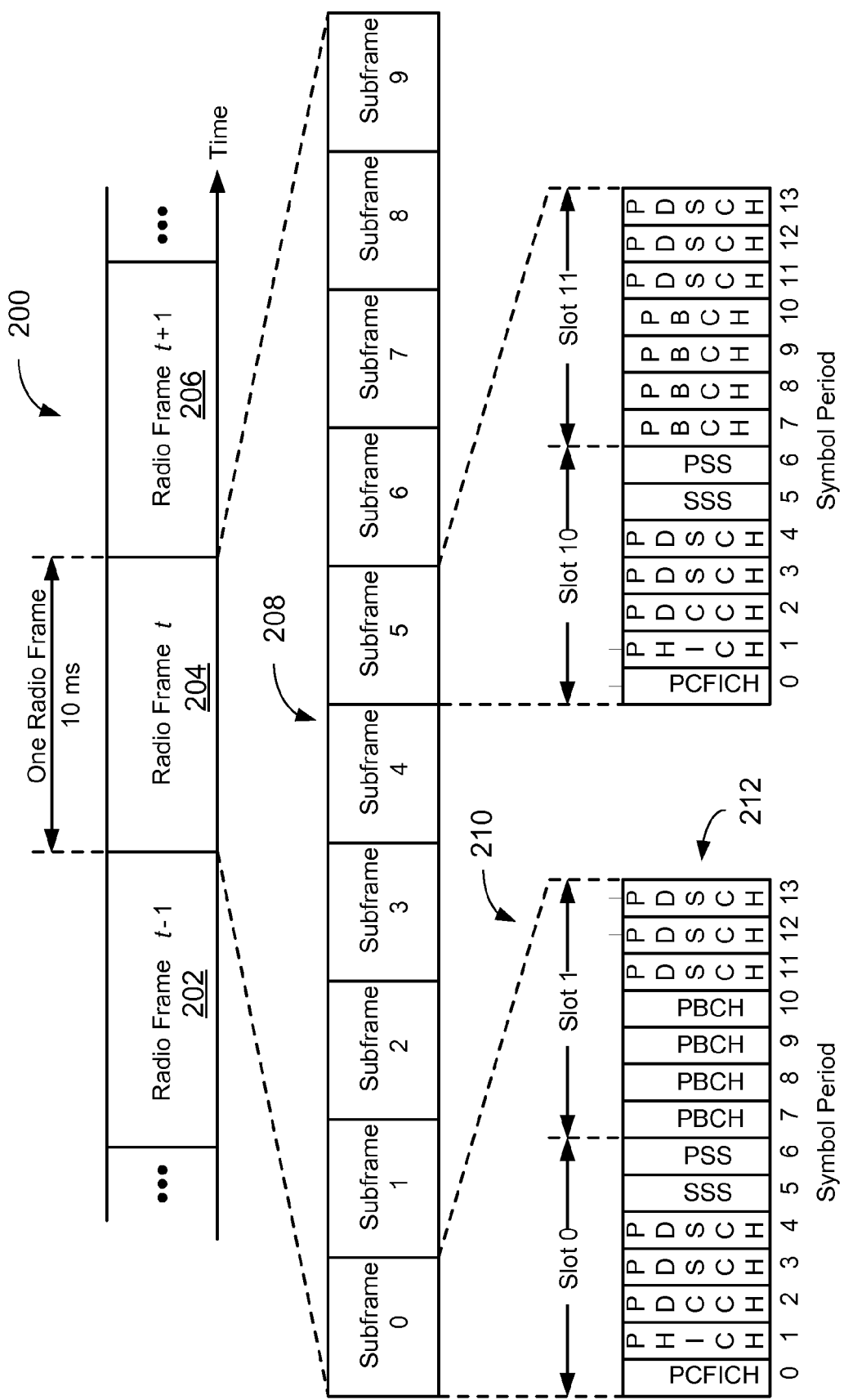
FIG. 2 is a block diagram conceptually illustrating an example of a down link frame structure in a telecommunications system.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
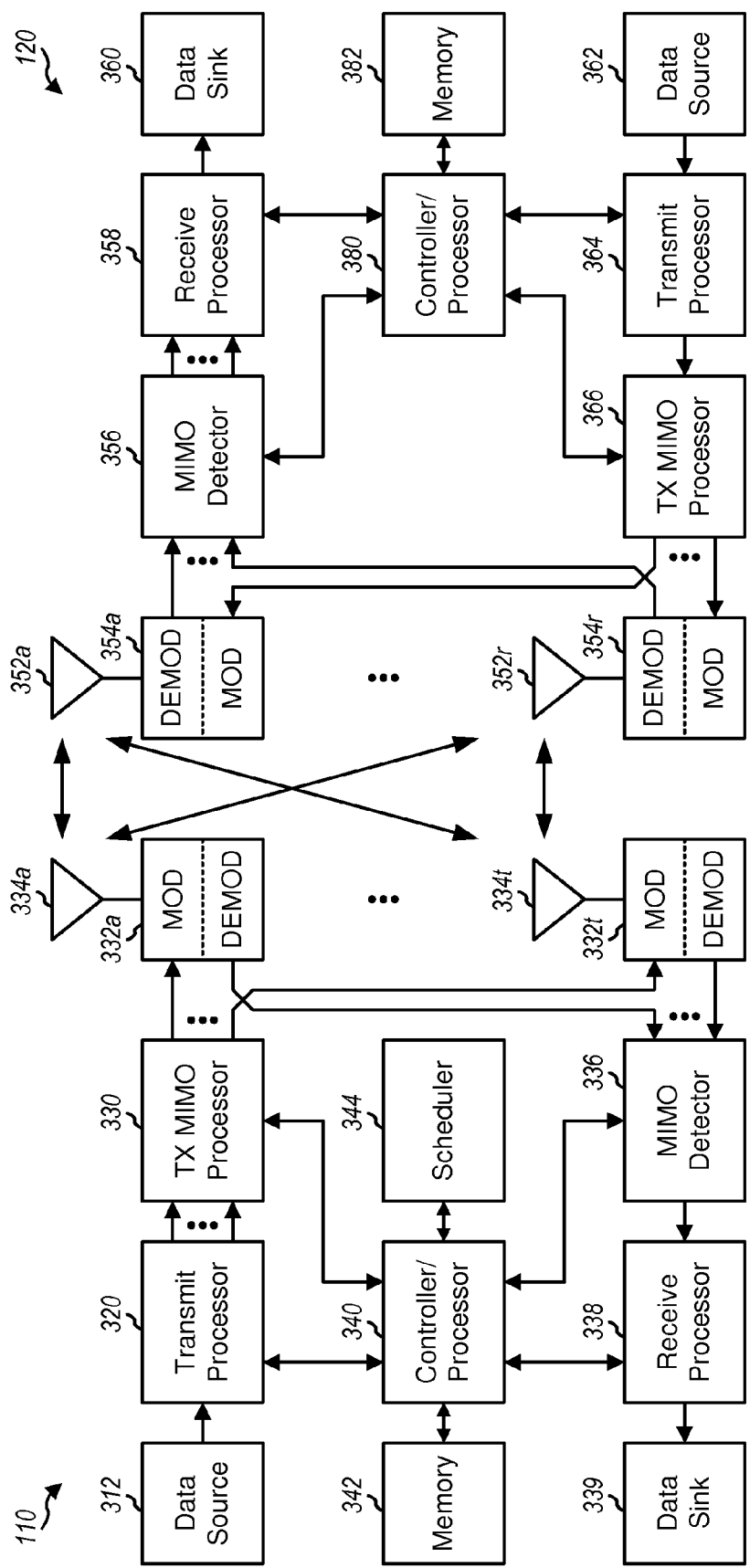
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4A, 4B, 5 and 6, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Carrier Aggregation

LTE-Advanced UEs use spectrum, in up to 20 MHz bandwidths, allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

Figure 4A:
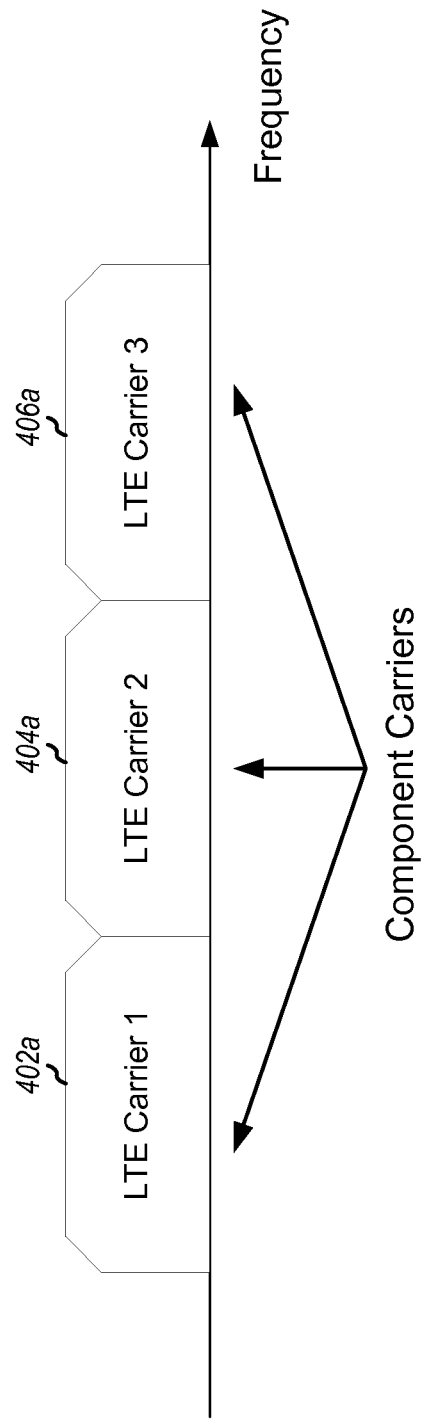
FIG. 4A discloses a contiguous carrier aggregation type.
Figure 4B:
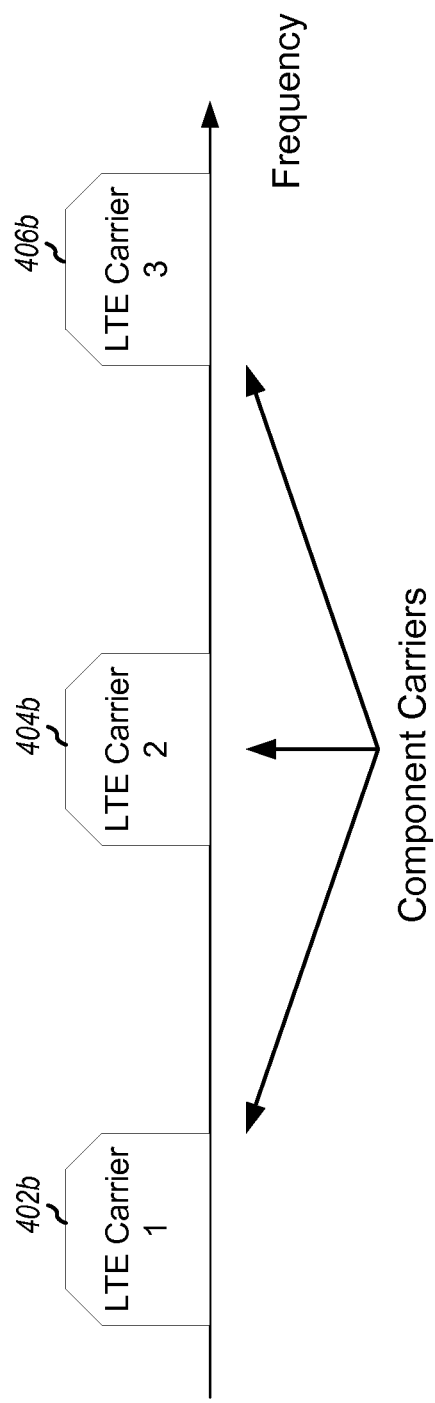
FIG. 4B discloses a non-contiguous carrier aggregation type.

For the LTE-Advanced mobile systems, two types of carrier aggregation (CA) methods have been proposed, contiguous CA and non-contiguous CA. They are illustrated in FIGS. 4A and 4B. Non-contiguous CA occurs when multiple available component carriers (e.g., 402b, 404b, 406b) are separated along the frequency band (FIG. 4B). On the other hand, contiguous CA occurs when multiple available component carriers (e.g., 402a, 404a, 406a) are adjacent to each other (FIG. 4A). Both non-contiguous and contiguous CA aggregate multiple LTE/component carriers to serve a single unit of an LTE Advanced UE.

Multiple RF receiving units and multiple FFTs may be deployed with non-contiguous CA in LTE-Advanced UE since the carriers are separated along the frequency band. Because non-contiguous CA supports data transmissions over multiple separated carriers across a large frequency range, propagation path loss, Doppler shift and other radio channel characteristics may vary a lot at different frequency bands.

Thus, to support broadband data transmission under the non-contiguous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
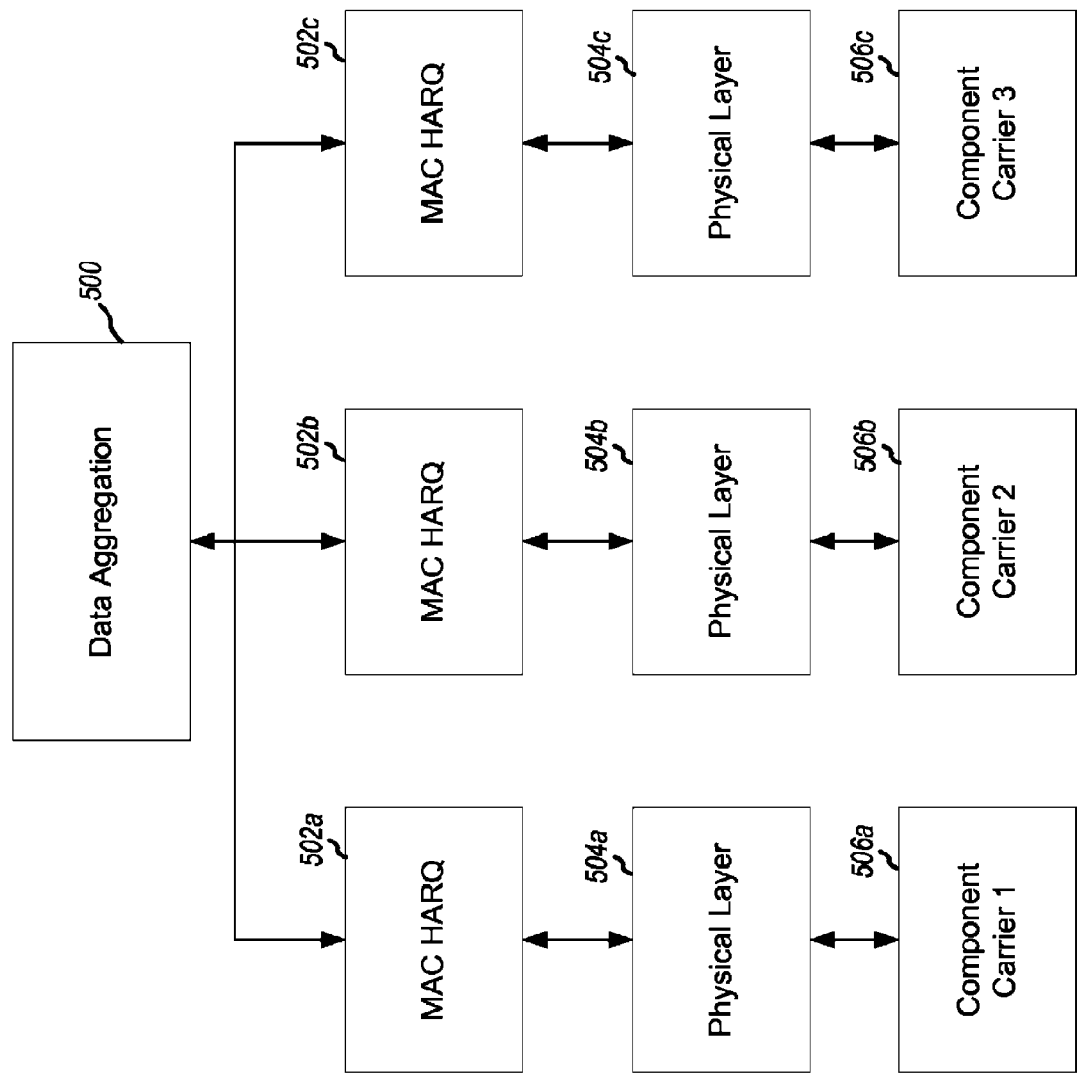
FIG. 5 discloses MAC layer data aggregation.

FIG. 5 illustrates aggregating transmission blocks (TBs) from different component carriers at the medium access control (MAC) layer (FIG. 5) for an International Mobile Telecommunications (IMT)-Advanced system. With MAC layer data aggregation (e.g., 500), each component carrier (e.g., 506a, 506b, 506c) has its own independent hybrid automatic repeat request (HARQ) entity (e.g., 502a, 502b, 502c) in the MAC layer and its own transmission configuration parameters (e.g., transmitting power, modulation and coding schemes, and multiple antenna configuration) in the physical layer (e.g., 504a, 504b, 504c). Similarly, in the physical layer, one HARQ entity is provided for each component carrier.

Control Signaling

In general, there are different approaches for deploying control channel signaling for multiple component carriers. A first method involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel, also called cross-carrier control channel signal scheduling. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method may not be compatible with LTE systems.

Cross-carrier control channel signaling may or may not be performed on the uplink channel and/or downlink channel for four possible configurations. Without cross-carrier control channel signaling, each component carrier may schedule control channel signals only for itself in its own control channel. With cross-carrier control channel signaling, at least one component carrier handles the control channel signaling, while at least one component carrier does not handle the control channel signaling. The at least one component carrier handling the control channel signaling may be considered the primary component carrier(s) (PCC(s)).

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNodeB to the UE, and on the uplink by the UE to the eNodeB.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE radio resource control (RRC) protocol.

Figure 6:
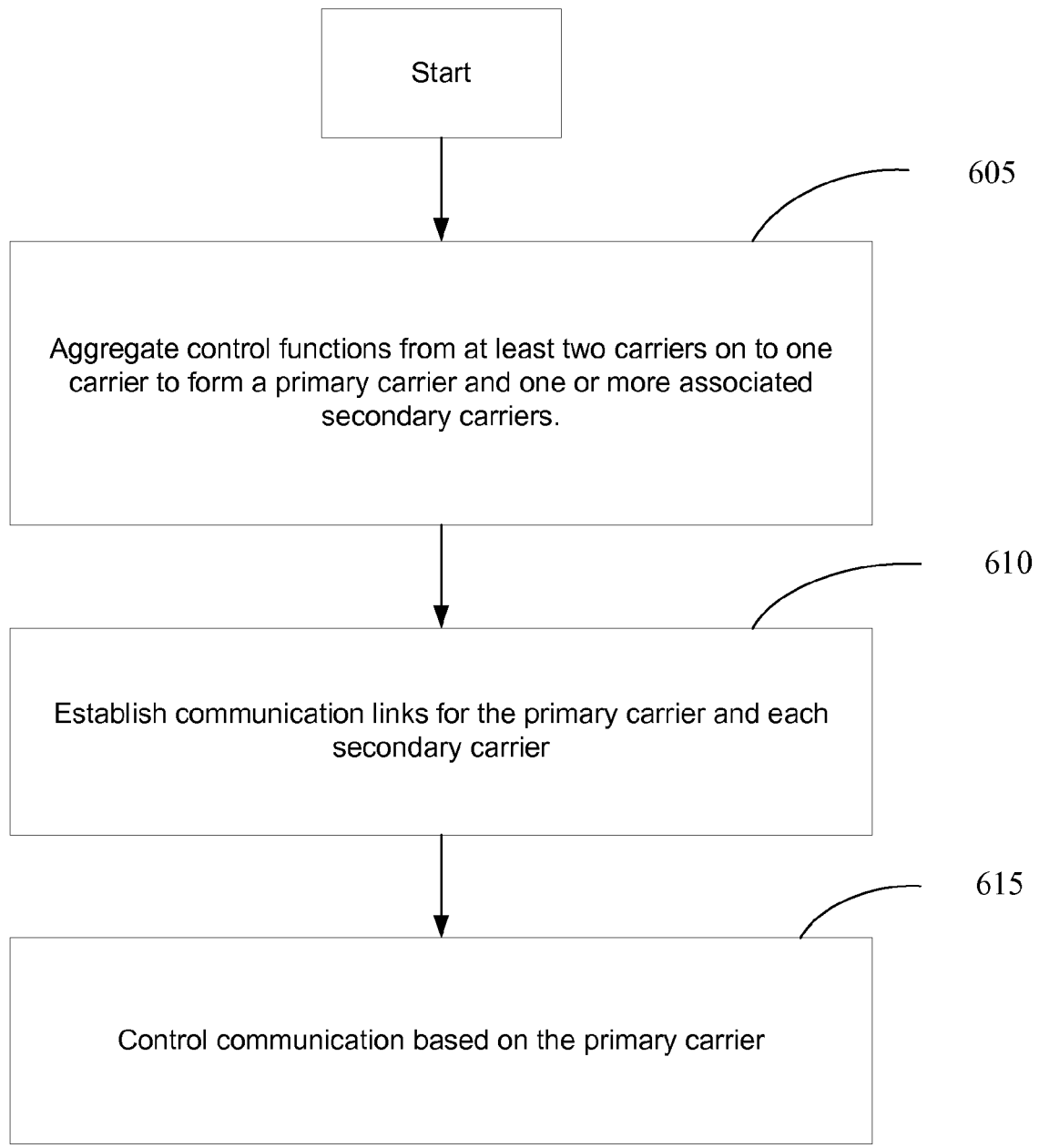
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

Various aspects related to communicating control data or control information for one or more aggregated carriers are described herein. Control data and control information are used interchangeably. As mentioned, control data for multiple aggregated carriers can be communicated over a single uplink carrier. Communicating the control data over a single uplink control channel carrier can provide benefits and simplify system design. For example, a single control channel enables power scaling of the channels as only one uplink control channel (e.g., PUCCH), which can be given the highest priority, needs to be processed at a time. Further, a single uplink control channel enables parallel configuration of the control channel (e.g., PUCCH) and shared channel (e.g., PUSCH). System design benefits from less blind detection of the control channel and simplified processing from receiving one UL CC transmission at a time. Joint ACK/NACK coding may also provide performance and design gains.

In one example, the multiple aggregated carriers can include at least one carrier that is a time division duplexing (TDD) carrier. Such carriers, however, do not always allow for uplink communications in all time intervals. Thus, aspects described herein relate to communicating control data for multiple carriers where at least one carrier is a TDD carrier having a different subframe configuration than at least one other of the multiple carriers. For example, where another one of the aggregated carriers is a frequency division duplexing (FDD) carrier, the FDD carrier can be utilized for communicating control data for the aggregated carriers at each time interval, at time intervals where the TDD or one or more other carriers do not allow uplink communications, and/or the like. Similarly, where the aggregated carriers include multiple TDD carriers, a TDD carrier allowing uplink communications in one or more time intervals can be utilized for communicating control data for the aggregated carriers. In LTE release 10, there is no aggregating of FDD and TDD component carriers. On the other hand in LTE release 11, TDD component carriers and FDD component carriers may be aggregated. In LTE release 10, all TDD component carriers have the same downlink/uplink configurations, while in LIE release 11, different downlink/uplink configurations for TDD component carriers may be supported.

Figure 7:
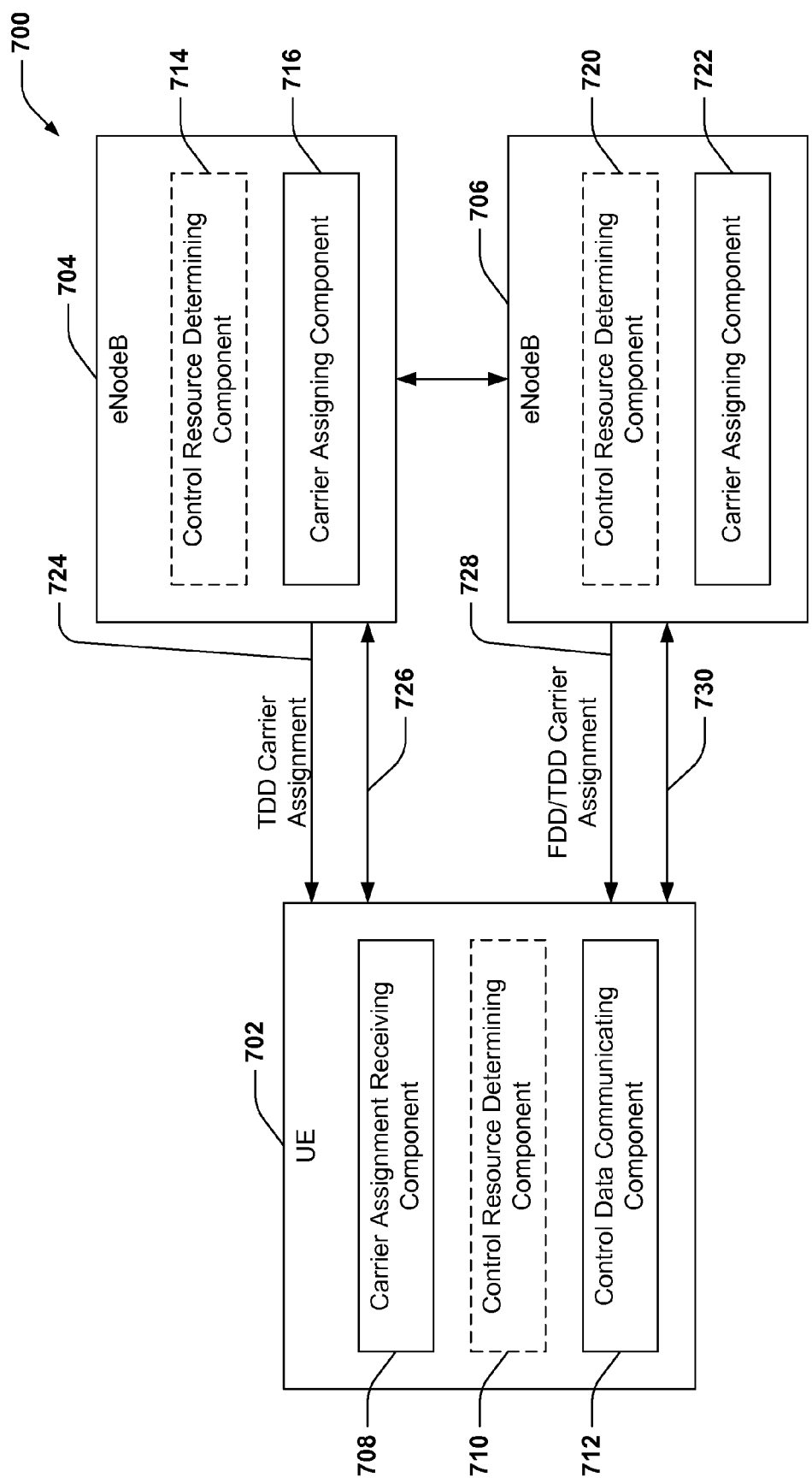
FIG. 7 is a block diagram of an aspect of an example system for communicating control data for aggregated carriers.

FIG. 7 illustrates an example system 700 for receiving multiple carrier assignments. System 700 includes a UE 702 that can communicate with one or more eNodeBs 704 and/or 706 in cells provided by the eNodeBs 704 and/or 706. For example, eNodeBs 704 and/or 706 can assign resources to the UE 702 in the form of one or more carriers for communicating therewith. UE 702 can be substantially any device that communicates in a wireless network, such as a wireless terminal, a modem (or other tethered device), a portion thereof, and/or the like. The eNodeBs 704 and 706 can each be a macrocell, femtocell, picocell, access point, a mobile base station, a relay node, a UE communicating in peer-to-peer or ad-hoc mode with UE 702, a portion thereof, and/or the like.

UE 702 includes a carrier assignment receiving component 708 that can obtain carrier assignments from eNodeB 704 and/or eNodeB 706, which can be aggregated carrier assignments, an optional control resource determining component 710 that can determine control resources, such as one or more carriers, over which to communicate control data for at least one of the carriers, and a control data communicating component 712 for communicating control data over a set of control resources.

eNodeBs 704 and 706 can each include an optional control resource determining component 714 and/or 720 for determining a control resource assignment for the UE 702 based at least in part on one or more aggregated carriers assigned to a UE, and carrier assigning components 716 and 722 for assigning one or more aggregated carriers to the UE.

According to an example, eNodeB 704 can transmit a TDD carrier assignment 724 to UE 702 including assigning the TDD carrier to UE 702 using carrier assigning component 716. Carrier assignment receiving component 708 can obtain an assignment of the TDD component carrier (CC) (also referred to herein as a carrier) 724 and can receive communications from eNodeB 704 over the TDD CC (e.g., carrier) 726. Similarly, eNodeB 706 can transmit a FDD or TDD (FDD/TDD) carrier assignment 728 to UE 702, and carrier assignment receiving component 708 can similarly obtain the assignment 728 and receive communications from eNodeB 706 over the FDD/TDD carrier 730. For example, the assignment 728 can be generated and communicated by carrier assigning component 722. Control data communicating component 712 can communicate control data relating to downlink communications over the TDD carrier 726, as well as the FDD/TDD carrier 730, using a primary component carrier (PCC), as described previously. For example, control data can correspond to HARQ or other retransmission feedback, channel state information (CSI), channel quality indicator (CQI), precoding matrix indicator (PMI), rank indicator (RI), etc.

For example, the carriers 726 and 730 can utilize a different subframe configuration (see Table 1 below). For instance, a subframe configuration can refer to one or more parameters related to the subframe regarding communicating thereover. In this example, a subframe configuration can refer to a type of communication allowed in the subframe (e.g., uplink, downlink, etc.). In this example, TDD carrier 726 can allocate a portion of subframes for communicating uplink data from the UE 702 to eNodeB 704, another portion for communicating downlink data from eNodeB 704 to UE 702, other portions for other purposes, and/or the like. Moreover, TDD carrier 726 can utilize special subframes, in one example, that allow both uplink and downlink communications. An FDD carrier, however, can have a similar configuration in each subframe allowing for both uplink and downlink communications within each subframe, which are multiplexed in frequency. In the depicted example, FDD/TDD carrier 730 can be a FDD or TDD carrier that uses a different subframe configuration than TDD carrier 726. For example, the PCC can be whichever carrier is configured with uplink subframes that are a superset of the uplink subframes for the carriers 726 and 730 and/or other carriers assigned to UE 702.

For example, where FDD/TDD carrier 730 is an FDD carrier, control data communicating component 712 can communicate control data for the aggregated carriers over this carrier, since FDD carriers can have uplink transmission opportunities at substantially all time slots (e.g., subframes). In one example, such carriers can be assigned to the UE 702 with a fixed configuration, but in other examples, control resource determining component 710 can select carriers over which to communicate uplink control data for the aggregated carriers. For example, where UE 702 communicates over multiple FDD carriers, control resource determining component 710 can select a FDD carrier as the PCC for communicating uplink control data. In one example, control resource determining component 710 can receive an indication of the PCC for communicating uplink control data over a layer 3 signal (e.g., RRC signaling from eNodeB 704 and/or 706), and/or instructions for determining the PCC. In an example, control resource determining component 710 can determine the FDD carrier for the PCC based at least in part on an index or priority related to the FDD carrier. For example, control resource determining component 710 can select a FDD carrier with the lowest index or highest priority as the PCC.

Where FDD/TDD carrier 730 is a TDD carrier (and/or UE 702 does not communicate over FDD carriers, for example), control data communicating component 712 can utilize the TDD carrier having uplink transmission subframes that are a superset of all TDD carriers utilized by UE 702 as the PCC for communicating uplink control data. In one example (e.g., in LTE), TDD carriers can support the following frame configurations as shown in Table 1:

TABLE 1

Subframe configurations having sets of uplink, downlink, and special subframes.

| Config Index | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 1 illustrates 7 frame configurations, 0 to 6. LTE Technical Specification 36.211 supports 7 configurations. Table 1 also illustrates: what type of subframes, numbered 0 to 9, that are contained by frame configuration. Each subframe can be labeled D, U or S which represent downlink, uplink, and special, respectively. Thus, for example, for configuration index 0, a TDD carrier can be used for downlink (D) communications in subframe 0 for 5 ms, then a special time period or switching time period (S) to switch to uplink for 5 ms in subframe 1, followed by uplink (U) communications for subframes 2, 3, and 4 for a total of 15 ms, etc. In this regard, using the above Table 1, control resource determining component 710 can select a TDD carrier as the PCC for communicating control data related to two aggregated TDD component carriers based at least in part on the following Table 2 or a similar table for different formats and/or additional TDD carriers:

TABLE 2

UL PCC selection for CC subframe combinations based on Table 1.

| First TDD Carrier Config Index | Second TDD Carrier Config Index | TDD Carrier Config Index for UL Control Data |
|---|---|---|
| 0 | {1, 2, 3, 4, 5, 6} | 0 |
| 1 | {2, 4, 5} | 1 |
| 2 | {5} | 2 |
| 3 | {4, 5} | 3 |
| 4 | {5} | 4 |
| 6 | {1, 2, 3, 4, 5} | 6 |
| 1 | {3} | Not supported |
| 2 | {3, 4} | Not Supported |

Thus, for example, if the first TDD component carrier has a configuration index of 0 and the second TDD component carrier has a configuration index of 1, 2, 3, 4, 5, or 6, then the first TDD component carrier will be the PCC. The reason is that the uplink subframes of the first TDD component carrier, including subframes 2, 3, 4, 7, and 8, are a superset of the uplink subframes for any of the other TDD component carriers having a configuration index of 1, 2, 3, 4, 5, or 6. For example, configuration index 3 has uplink subframes 2, 3, and 4 which is a subset of the uplink subframes for configuration index 0. (See Table 1). It is also shown in Table 2 that some configurations are not supported. For instance, where one TDD carrier is configured for configuration index 1 and the other configured for index 3, may not be supported since there are periods where configuration 1 does not allow uplink communication while configuration 3 does allows uplink communication and vice versa. Thus, neither frame configuration has uplink subframes which act as a superset for the other frame configuration's uplink subframes. In another example, as described, rather than control resource determining component 710 making such determinations, control data communicating component 712 can utilize a carrier as the PCC according to a received configuration, which may have been configured based on the foregoing logic. In this example, logic for implementing Table 1 and Table 2 above specifically for LTE can be configured in the UE 702, and control data communicating component 712 can communicate control data over the appropriate PCC based on Table 1 and Table 2 and the configuration indices of carriers 726 and 730.

In another example, control data communicating component 712 can utilize different carriers in different subframes as PCC for transmitting control data for the aggregated carriers. That is, the PCC can change based on which subframe is being transmitted. The subframes can be referred to as a primary uplink subframe (PUS), where each PUS can have a carrier assigned as a PCC in the corresponding subframe. For example, where one of the TDD carrier 726 or FDD/TDD carrier 730 is available for uplink communication in a given period of time, that carrier can be selected as the PCC for the PUS. Where multiple carriers, such as TDD carrier 726 and FDD/TDD carrier 730 are available for transmitting control data in a given period of time, control data communicating component 712 can use a carrier as the PCC according to a received configuration. In a first example there are two component carriers, the first is a TDD component carrier and the second is a FDD component carrier. If the TDD component carrier has no UL subframes, then the FDD carrier is the PCC for all the subframes. On the other hand, if subframes of the TDD component carrier may be utilized for uplink control communications, selection of the PCC may be based on RRC configuration. In one example, the control resource determining component 710 can receive an indication of a carrier that is to be the PCC for the PUS and/or one or more parameters related to determining which carrier to use as the PCC where multiple carriers are available. In one example, control resource determining component 710 can select a carrier based at least in part on determining the carrier based on a cell index or priority (e.g., determining a highest priority or lowest cell index carrier with an uplink transmission opportunity in the PUS). Moreover, in an example, an FDD carrier, where available, can be used in substantially all subframes as the PCC for transmitting uplink control data for the aggregated carriers, since the FDD is typically available for uplink transmissions in substantially all subframes. In another example, control resource determining component 710 can cycle through the carriers available for uplink communication, whether FDD and/or TDD, for given PUSs.

The downlink assignment index (DAI) is a field in the downlink resource grant signaled to a UE which indicates how many subframes in a time window contain transmissions to that UE. This is applicable when LTE is operated in Time Domain Duplex (TDD) mode. In addition, the DAI enables the UE to determine whether it has received all the downlink transport blocks for which it should transmit a combined ACK/NACK. See 3GPP TS36.213 Section 7.3. Additionally, where an FDD carrier is used, the DAI can be used to indicate a number of transmissions over the FDD carrier relating to control data for the aggregated carriers. The DAI can be included in a new downlink control indicator (DCI) format, for example, in LTE. In this example, the carrier assignment receiving component 708 can also obtain the DAI, and utilize the DAI to determine a number of HARQ feedback values for piggybacking in one or more control data transmissions. Moreover, in another example, TDD carrier 726 can be used as PCC for uplink control data transmissions for the aggregated carriers in time periods where uplink transmissions are allowed at TDD carrier 726, and the FDD/TDD carrier 730 can be an FDD carrier that can be used for uplink control data transmission where TDD carrier 726 is not available, e.g., does not have corresponding UL subframes.

It is to be appreciated that control resource determining components 714 and/or 720 can similarly determine control resources (e.g., a PCC) for UE 702, as described with respect to control resource determining component 710 above. For example, eNodeB 704 can communicate carriers assigned to UE 702 to eNodeB 706 and/or vice versa over a backhaul connection. In another example, UE 702 can notify eNodeB 706 of carriers assigned by eNodeB 704, and/or vice versa. Moreover, in an example, control resource determining components 714 and/or 720 can determine a scheduling priority for assigning control resources for UE 702 in a given time period. For example, where TDD carrier 726 is available for uplink control data in a given time period, control resource determining components 714 and/or 720 can determine to assign control resources to the UE 702 over TDD carrier 726. In this example, during the time periods where TDD carrier 726 is used to communicate uplink control data, eNodeB 706 can assign additional downlink resources over FDD/TDD carrier 730 to UE 702, since it need not reserve resources for uplink control data communications during those time periods.

Moreover, in an example, control resource determining components 714 and/or 720 can determine whether to assign control resources to UE 702 over TDD carrier 726 or FDD/

TDD carrier 730 based at least in part on determining load balancing based on a load on each carrier. For example, in a time period where the TDD carrier 726 is available for uplink communications, control resource determining components 714 and/or 720 can determine whether the UE 702 should use the TDD carrier 726 or FDD/TDD carrier 730 for communicating uplink control data in a time period based on a load of the TDD carrier 730 in the time period as compared to a load on the FDD/TDD carrier 730.

In any case, eNodeB 704 and eNodeB 706 can communicate over a backhaul connection, and thus, for example, eNodeB 704 can provide control data intended for eNodeB 706 over the backhaul link and/or vice versa. In another example, eNodeBs 704 and 706 can coordinate resources over which to receive uplink control data communications from UE 702 using similar logic as described above for UE 702. Thus, in an example, eNodeBs 704 and/or 706 can include a control resource determining component 710 or similar component for discerning resources for receiving the uplink control data related to the aggregated carriers.

Moreover, though shown and described in terms of determining carriers for communicating uplink data, it is to be appreciated that similar concepts can be applied to determining the PCC for downlink data as well. For example, TDD carrier 726 may not be available for downlink transmission in every time period (e.g., subframe). Thus, where FDD/TDD carrier 730 is available, it can be the PCC for downlink communications. Where both are available, an RRC signaling, index or priority, etc. can be used to determine the PCC. The corresponding subframe can be referred to as a physical downlink subframe (PDS).

Similarly, in this example, control resource determining components 714 and/or 720 can determine whether to communicate to UE 702 in a given PDS similarly to control resource determining component 710. In addition, for example, since different subframes can be subject to different interference in heterogeneously deployed networks (HetNet) (e.g., networks including femtocell access points deployed in macrocells without planning), eNodeBs 704 and/or 706 can instruct the UE 702 to perform radio resource management (RRM) and/or radio link management (RLM) for certain PDSs (e.g., and not others). For example, eNodeB 704 and/or 706 can instruct UE 702 to perform RRM/RLM in PDSs corresponding to a single CC. In one example, UE 702 can perform RRM/RLM on PDSs relating to a CC according to one or more criteria (e.g., a CC with a lowest cell index), whether instructed by eNodeB 704 and/or 706 or otherwise. In the presence of HetNet cells (e.g, femtocell and picocell), the downlink received power may be biased at a power level (e.g., 0 dB to 118 dB). For low to medium bias (e.g, a single digit dB), the subframes in PDS subject to less interference for the UE can be scheduled more often, while the subframes in the PDS subject to stronger interference can be used only if necessary. The subframes in PDS subject to strong interference for the UE can necessitate the use of large PDCCH aggregation levels or a new control channel in order for the control channel to reach the UE.

Figure 8:
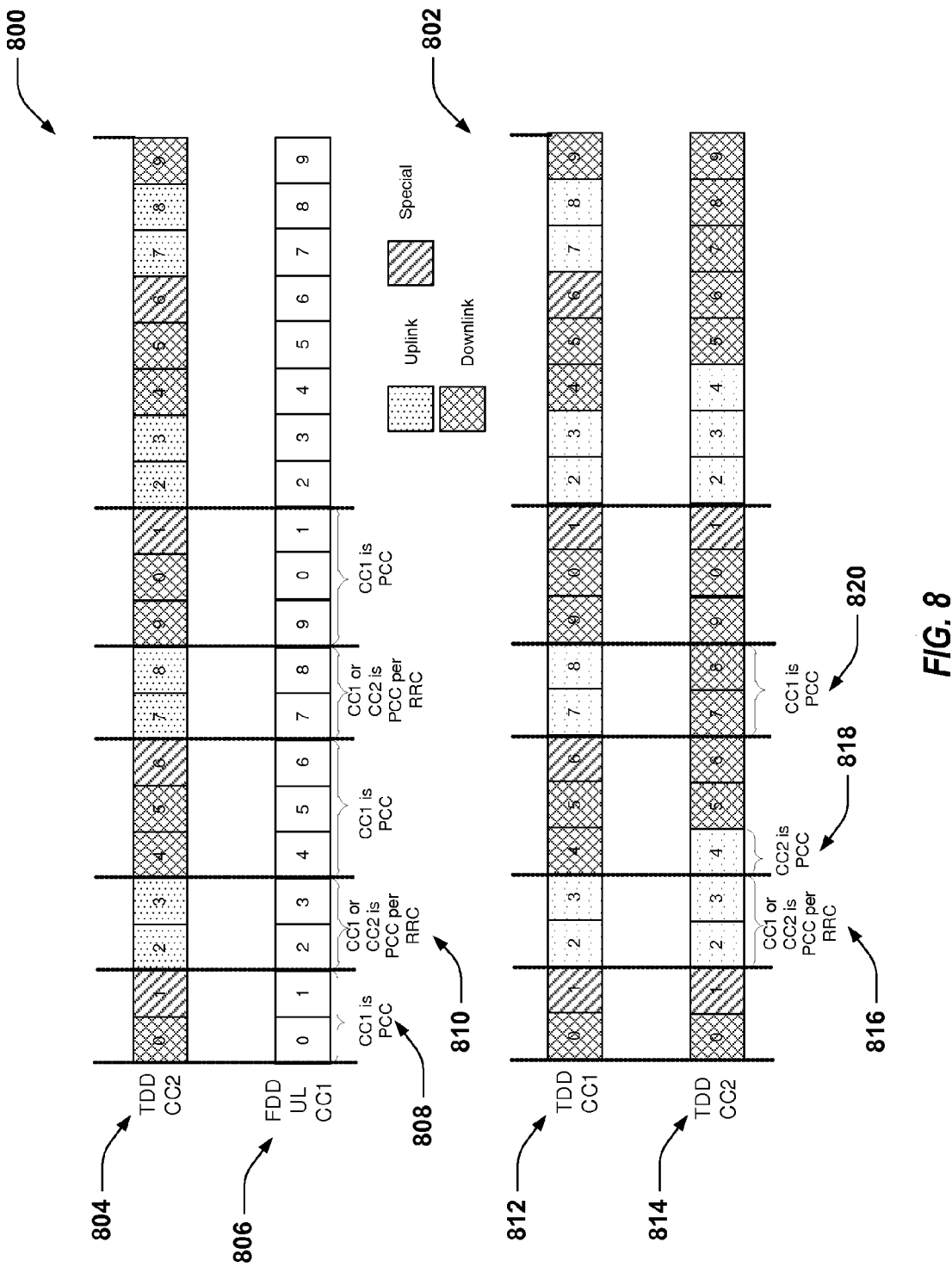
FIG. 8 is a block diagram of example carrier configurations for determining a primary component carrier (PCC)

FIG. 8 depicts example carrier configurations 800 and 802 that can be assigned to a device in carrier aggregation. For example, carrier configuration 800 includes a TDD carrier 804 and a FDD carrier 806. As described above, for example, FDD carrier 806 can be used as the PCC for uplink control communications in most subframes, such as subframes 0 and 1 at 808, since uplink communication is typically available at the FDD carrier, that is, all the subframes in a FDD component carrier typically have an uplink component. Since only the FDD component carrier 806 contains subframes which can be utilized for uplink control communications for subframes 0 and 1, FDD component carrier 806 may be used as the PCC. Where only the FDD component carrier contains subframes which may be utilized for uplink control communications, it may be used as the PCC. On the other hand, for subframes where both the TDD component carrier 804 and the FDD component carrier 806 may be utilized for uplink control communications, selection of the PCC may be based on RRC configuration. For example, TDD carrier 804 can be utilized for some uplink control communications, such as for subframes 2 and 3 at 810 since those subframes may be utilized for uplink control communications as indicated by the dotted pattern. As described, this can be configured via layer 3 or other RRC layer signaling either explicitly or as one or more instructions for determining the PCC, such as comparing an index (e.g., select a component carrier with the lowest cell index) or priority of the carriers 804 and 806. Carrier configuration 802 includes two TDD carriers 812 and 814. For example, TDD carrier 812 can use TDD configuration index 1 from the Table 1 above while TDD carrier 814 uses TDD configuration index 3. In this example, the PCC is provided in subframes where at least one carrier 812 and/or 814 is available for uplink transmissions, such as in subframes 2 and 3 for TDD carrier 812 at 816, and subframe 4 for TDD carrier 814 at 818, subframes 7 and 8 for TDD carrier 812 at 820, etc. At 816, where both TDD component carriers 812, 814 have subframes available for uplink transmissions, the TDD carrier can be selected based at least in part on RRC signaling, as described, and/or one or more instructions received over RRC signaling. The given subframe having a PCC can be referred to as a PUS, as described, where the PCC can change for the given PUS. Where only one TDD component carrier has subframes available for uplink transmissions, such as subframe 4 for TDD component carrier 814 at 818, subframe 814 in TDD component carrier 814 will be the PUS.

Figure 9:
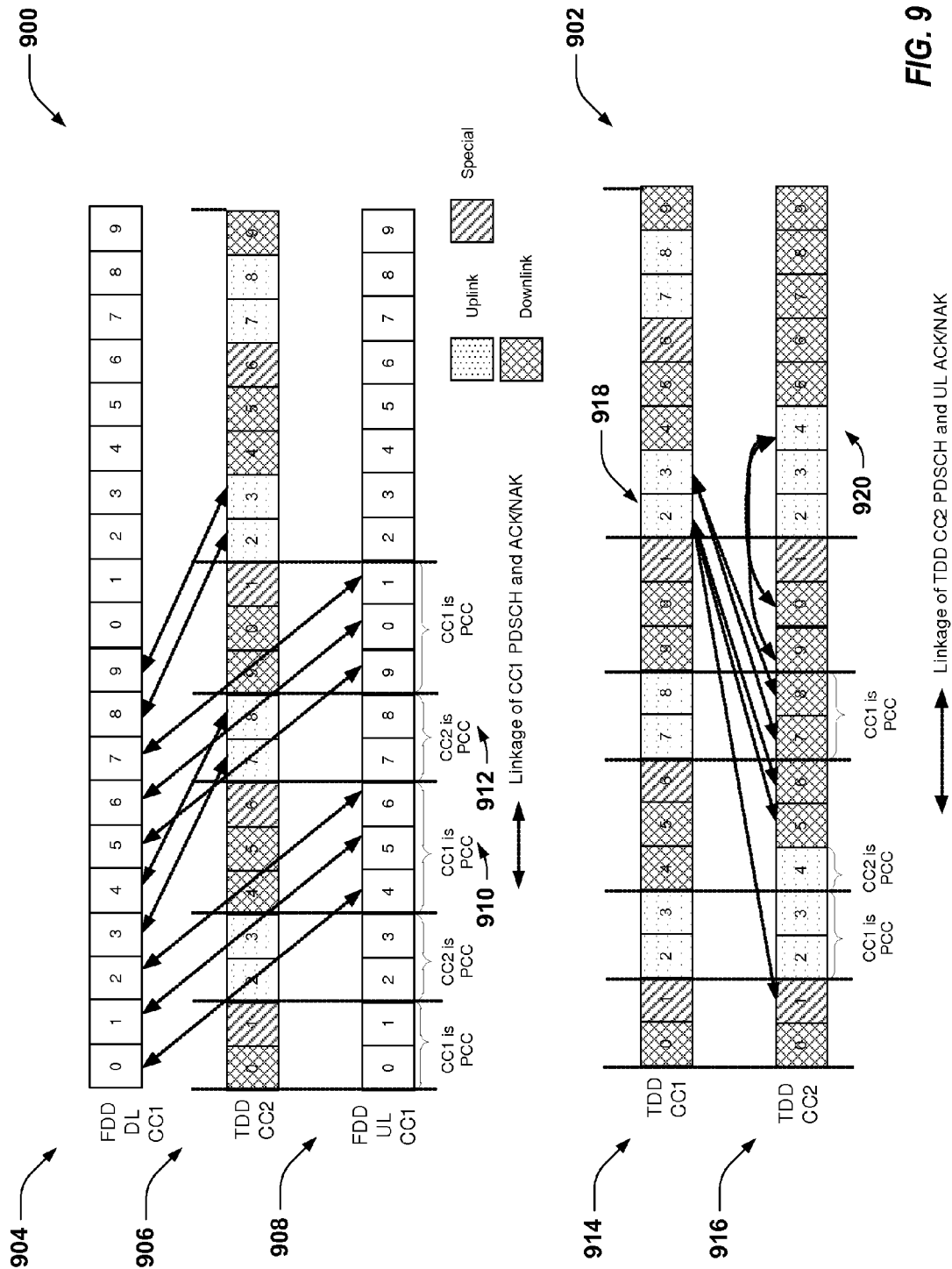
FIG. 9 is a block diagram of example carrier configurations for mapping retransmission resources.

FIG. 9 illustrates example carrier configurations 900 and 902 for scheduling HARQ communications. Carrier configuration 900 comprises a FDD downlink (DL) carrier 904, a TDD carrier 906, and a FDD uplink (UL) carrier 908. As depicted, between TDD carrier 906 and FDD UL carrier 908, uplink transmissions are available for each subframe. Thus, HARQ feedback for communications received over FDD DL carrier 904 can be mapped to FDD UL carrier 908 in some subframes, such as subframes 4, 5, and 6 at 910, and to TDD carrier 906 in other subframes where uplink transmissions are allowed, such as subframes 7 and 8 at 912. The PCC for a given PUS can be determined, as described, based at least in part on layer 3 RRC signaling regarding the PCC, instructions for determining the PCC, etc. Carrier configuration 902 comprises two TDD carriers 914 and 916, where TDD component carrier 914 is configured with downlink/uplink configuration index 1 from Table 1 and TDD component carrier 916 is configured with downlink/uplink configuration index 2 from Table 1. In this configuration 902, feedback for multiple subframes can be aggregated for transmitting related control data in subframes 2 and 3 at 918 when TDD carrier 914 is selected as the PCC. Similarly, control data for additional subframes can be aggregated for transmission in subframe 4 at 920 where TDD carrier 916 is selected as the PCC, at least since TDD carrier 914 is not available for uplink communication.

Figure 10:
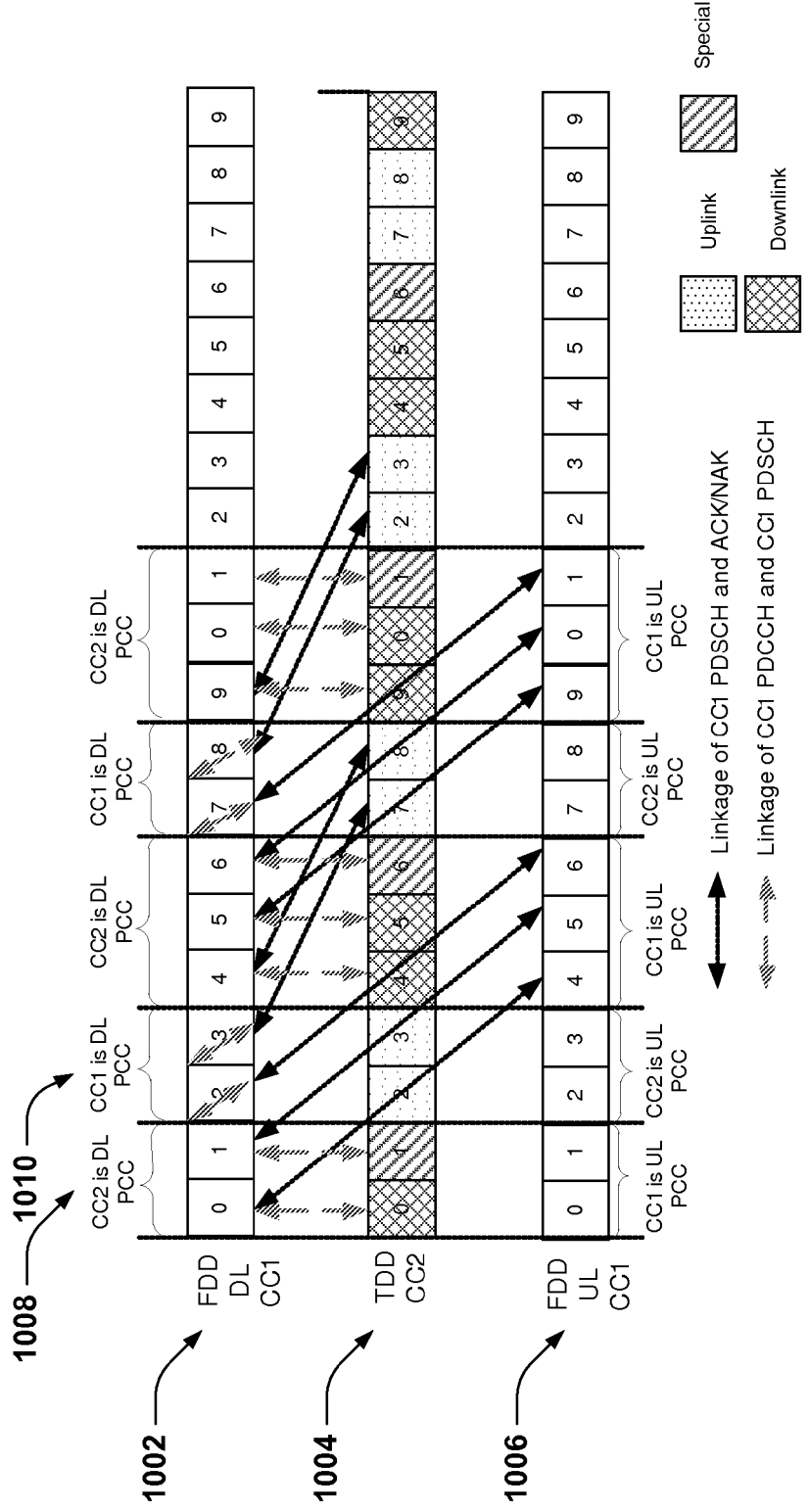
FIG. 10 is a block diagram of an example carrier configuration for determining an uplink PCC and a downlink PCC.

FIG. 10 shows an example carrier configuration 1000 for determining uplink and downlink carriers for communicating over aggregated carriers. Carrier configuration 1000 includes a FDD DL carrier 1002, a TDD carrier 1004, and a FDD UL carrier 1006. In this example, HARQ feedback can be mapped as shown with respect to FIG. 9 above in various PUSs. In addition, however, downlink carriers can be determined for communicating data as well based at least in part on carriers that are available for transmitting downlink data. Thus, as shown, TDD carrier 1004 can be the PCC for communicating DL data in subframes 0 and 1 at 1008 since it is available to carry the downlink transmission in those subframes, whereas FDD DL carrier 1002 can be used to communicate DL data in subframes 2 and 3 at 1010, at least since TDD carrier 1004 is unavailable for downlink communication. For example, where both FDD DL carrier 1002 and TDD carrier 1004 are available for communicating DL data (e.g., at subframes 0 and 1 at 1008), both carriers can be utilized and/or one can be selected as the PCC according to RRC signaling, as described. The subframe for which a DL carrier is opportunistically assigned can be referred to as a PDS.

Referring to FIGS. 11 and 13-16, example methodologies relating to communicating control data for aggregated carriers are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts. For example, it is to be appreciated that a methodology could alternatively be represented as a series of interrelated states or events, such as in a state diagram. Moreover, not all illustrated acts may be required to implement a methodology in accordance with one or more embodiments.

Figure 11:
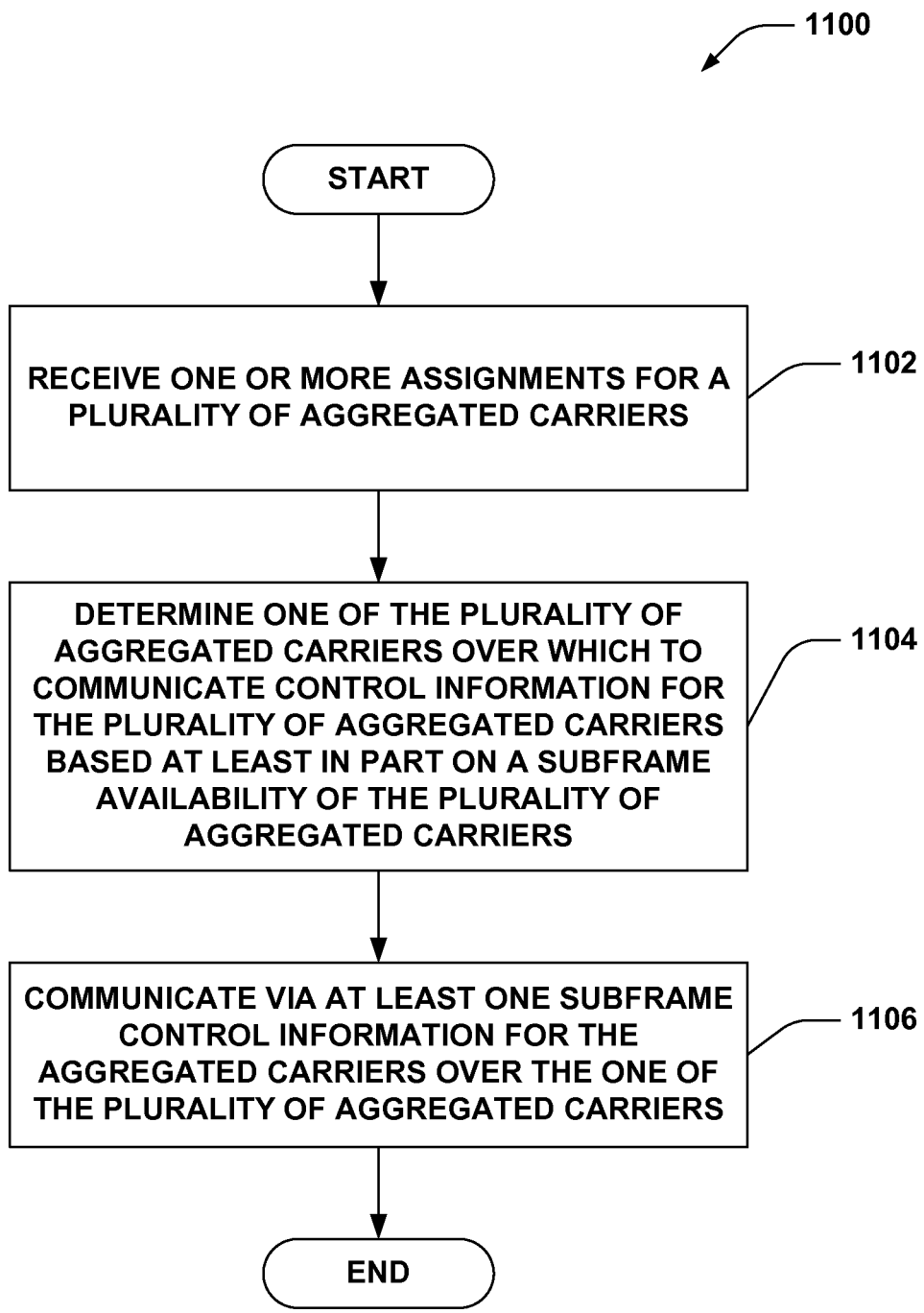
FIG. 11 is a block diagram illustrating a method for communicating control data for aggregated carriers.

FIG. 11 illustrates an example methodology 1100 for communicating control information for a plurality of aggregated carriers. At 1102, one or more assignments can be received for a plurality of aggregated carriers. As described, at least one of the plurality of aggregated carriers can be a TDD carrier having a different subframe configuration than at least another one of the plurality of aggregated carriers. For example, the plurality of carriers can comprise additional TDD carriers and/or one or more FDD carriers. At 1104, one of the plurality of aggregated carriers can be determined over which to communicate control information for the aggregated carriers based at least in part on a subframe availability of the plurality of aggregated carriers. For example, this can include determining the one carrier (e.g., the PCC) as a carrier having a superset of subframes available for uplink transmissions as all of the plurality of aggregated carriers. In another example, this can include dynamically determining a carrier in a given subframe for communicating control information in the subframe. This can be based at least in part on determining a carrier available for uplink transmission in the subframe. Where multiple carriers are available in either scenario, a carrier can be selected based on receiving signaling as to which carrier to select, instructions on selecting a carrier (e.g., select the carrier with the lowest index or highest priority), etc. At 1106, control information for the plurality of aggregated carriers can be communicated via at least one subframe over the one of the plurality of aggregated carriers. For example, step 1106 can occur without step 1104 where the carrier selection is hardcoded or otherwise received in a configuration, where the effect of using the carrier as the PCC is as explained above.

It will be appreciated that, in accordance with one or more aspects described herein, inferences can be made regarding determining which carrier to select as the PCC (e.g., for a given subframe or otherwise), and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
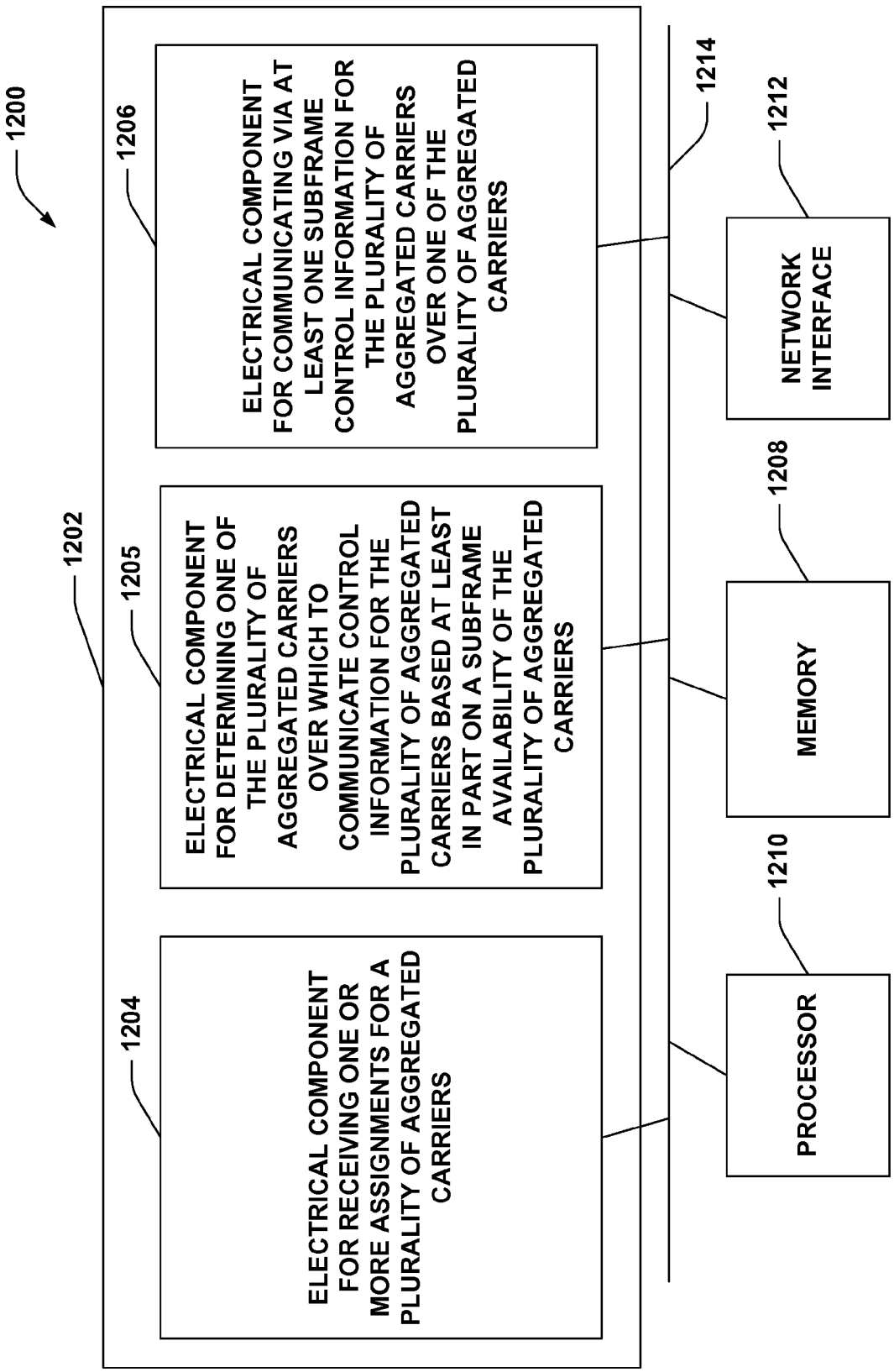
FIG. 12 is a block diagram of an aspect of an example system for communicating control data for a plurality of aggregated carriers.

With reference to FIG. 12, illustrated is a system 1200 that communicates control information for one or more aggregated carriers. For example, system 1200 can be configured as a UE, or as a processor, component, or similar device for use within the UE. It is to be appreciated that system 1200 is represented as including functional blocks, which can be functional blocks that represent functions implemented by a processor, software/firmware, etc. System 1200 includes a logical grouping 1202 of components (e.g., electrical components) that can act in conjunction. For instance, logical grouping 1202 can include an electrical component 1204 receiving one or more assignments for a plurality of aggregated carriers. Component 1204, for example, can include at least one control processor coupled to a network interface (e.g., transmitter, receiver, transceiver), or the like and to a memory with instructions for receiving the one or more assignments. For example, at least one carrier can be a TDD carrier having a different subframe configuration than at least another one of the plurality of aggregated carriers. For example, the plurality of carriers can comprise additional TDD carriers and/or one or more FDD carriers. Further, logical grouping 1202 can include an electrical component 1205 for determining one of the plurality of aggregated carriers over which to communicate control information for the aggregated carriers based at least in part on a subframe availability of the plurality of aggregated carriers. Further, logical grouping 1202 can include an electrical component 1206 for communicating via at least one subframe the control information for the plurality of aggregated carriers over one of the plurality of aggregated carriers. Component 1206, for example, can include at least one control processor coupled to a network interface (e.g., transmitter, receiver, transceiver), or the like and to a memory with instructions for communicating the control information. As described, the one carrier (e.g., a PCC) can be used for communicating control information according to one or more scenarios.

For example, the carrier can be a carrier having a superset of subframes available for uplink transmission of those subframes related to all available carriers. In another example, the carrier can be a FDD carrier. Moreover, the carrier can be determined according to signaling, index, priority, etc. where one or more carriers are available for uplink transmission. The carrier can be selected and/or assigned in a hardcoding or configuration, as described. For example, electrical component 1204 can include a carrier assignment receiving component 708, as described above. In addition, for example, electrical component 1206 can include a control data communicating component 712, as described.

In related aspects, the system 1200 can optionally include a processor component 1210 having at least one processor, in the case of the system 1200 configured as a UE. The processor 1210, in such case, can be in operative communication with the components 1204-1206 or similar components via a bus 1214 or similar communication coupling. The processor 1210 can effect initiation and scheduling of the processes or functions performed by electrical components or modules 1204-1206.

In further related aspects, the system 1200 can include a network interface component 1212 for communicating with other network entities. The system 1200 can optionally include a component for storing information, such as, for example, a memory device/component 1208. The computer readable medium or the memory component 1208 can be operatively coupled to the other components of the system 1200 via the bus 1214 or the like. The memory component 1208 can be adapted to store computer readable instructions and data for performing the activity of the components 1204-1206, and subcomponents thereof, or the processor 1210, or other methods disclosed herein. The memory component 1208 can retain instructions for executing functions associated with the components 1204-1206. While shown as being external to the memory 1208, it is to be understood that the components 1204-1206 can exist within the memory 1208.

Figure 13:
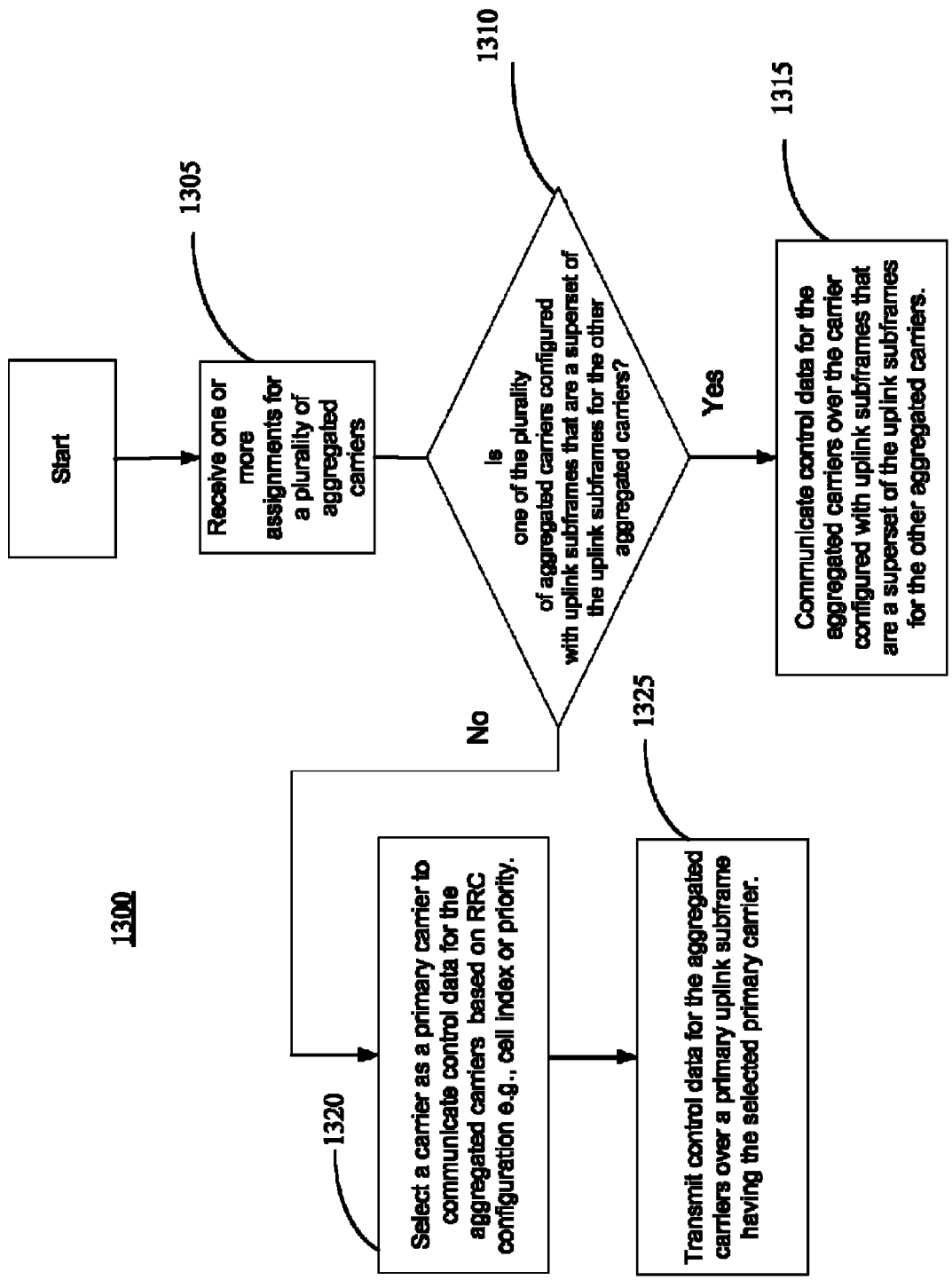
FIG. 13 is a block diagram illustrating a method for selecting a carrier for communicating control data.

FIG. 13 illustrates an example methodology 1300 for selecting a carrier as a PCC. At 1305, one or more assignments for a plurality of aggregated carriers can be received. At 1310, it can be determined whether one of the plurality of aggregated carriers is configured with uplink subframes that are a superset of the uplink subframes for the other aggregated carriers. If so, at 1315, control data for the aggregated carriers can be communicated over the carrier configured with uplink subframes that are a superset of the uplink subframes for the other aggregated carriers. If not, at 1320, a carrier can be selected as a primary carrier to communicate control data for the aggregated carriers based on RRC configuration (e.g., cell index or priority). At 1325, then, control data for the aggregated carriers can be transmitted over a PUS having the selected primary carrier.

Figure 14:
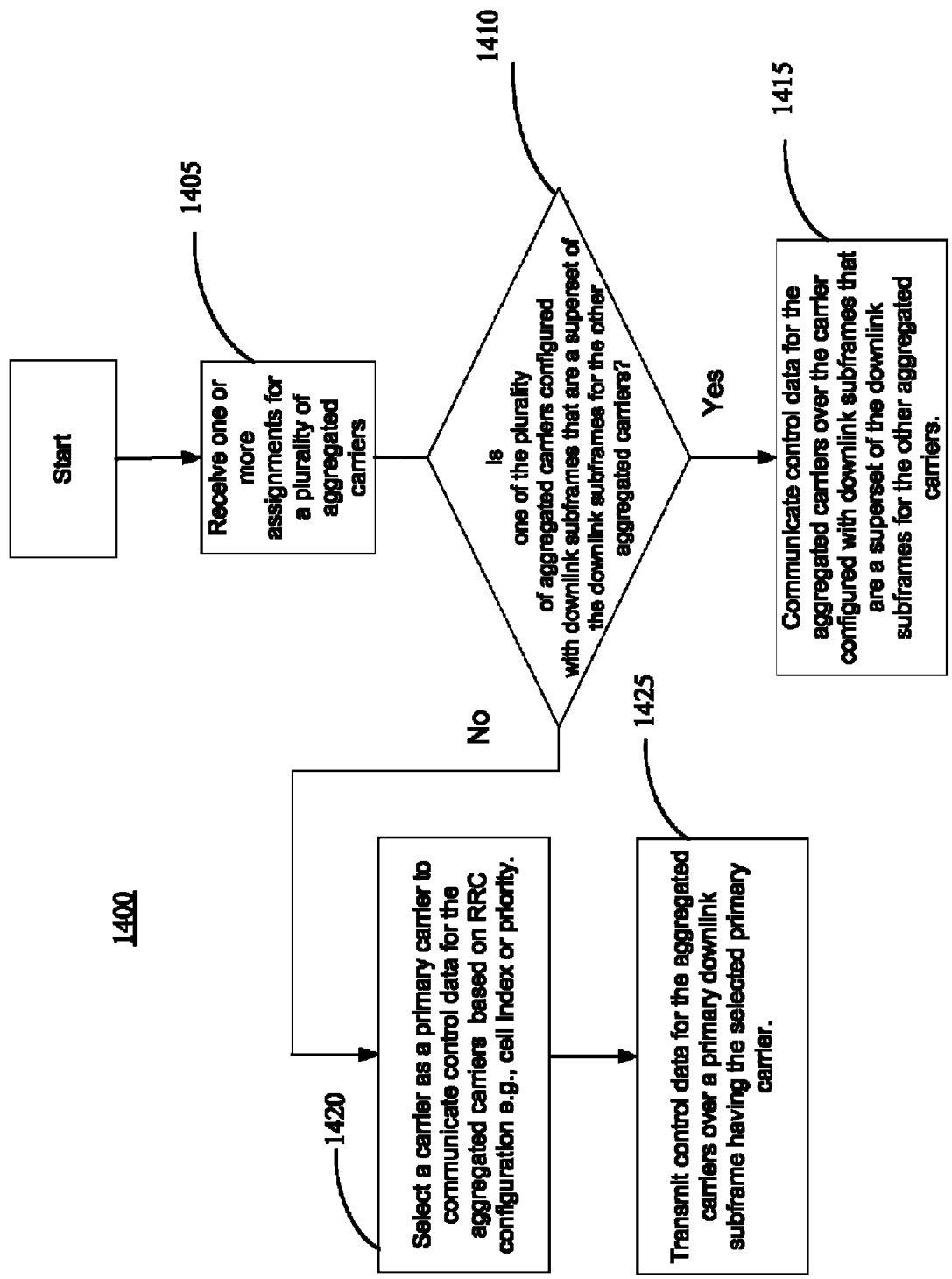
FIG. 14 is a block diagram illustrating a method for selecting a PCC for control data communications.

FIG. 14 illustrates an example methodology 1400 for communicating control data for aggregated carriers. At 1405, one or more assignments for a plurality of aggregated carriers can be received. At 1410, it can be determined whether one of the plurality of aggregated carriers is configured with downlink subframes that are a superset of the downlink subframes for the other aggregated carriers. If so, at 1415, control data for the aggregated carriers can be communicated over the carrier configured with downlink subframes that are a superset of the downlink subframes for the other aggregated carriers. If not, at 1420, a carrier can be selected as a primary carrier to communicate control data for the aggregated carriers based on RRC configuration (e.g., cell index or priority). At 1425, then, control data for the aggregated carriers can be transmitted over a PDS having the selected primary carrier.

Figure 15:
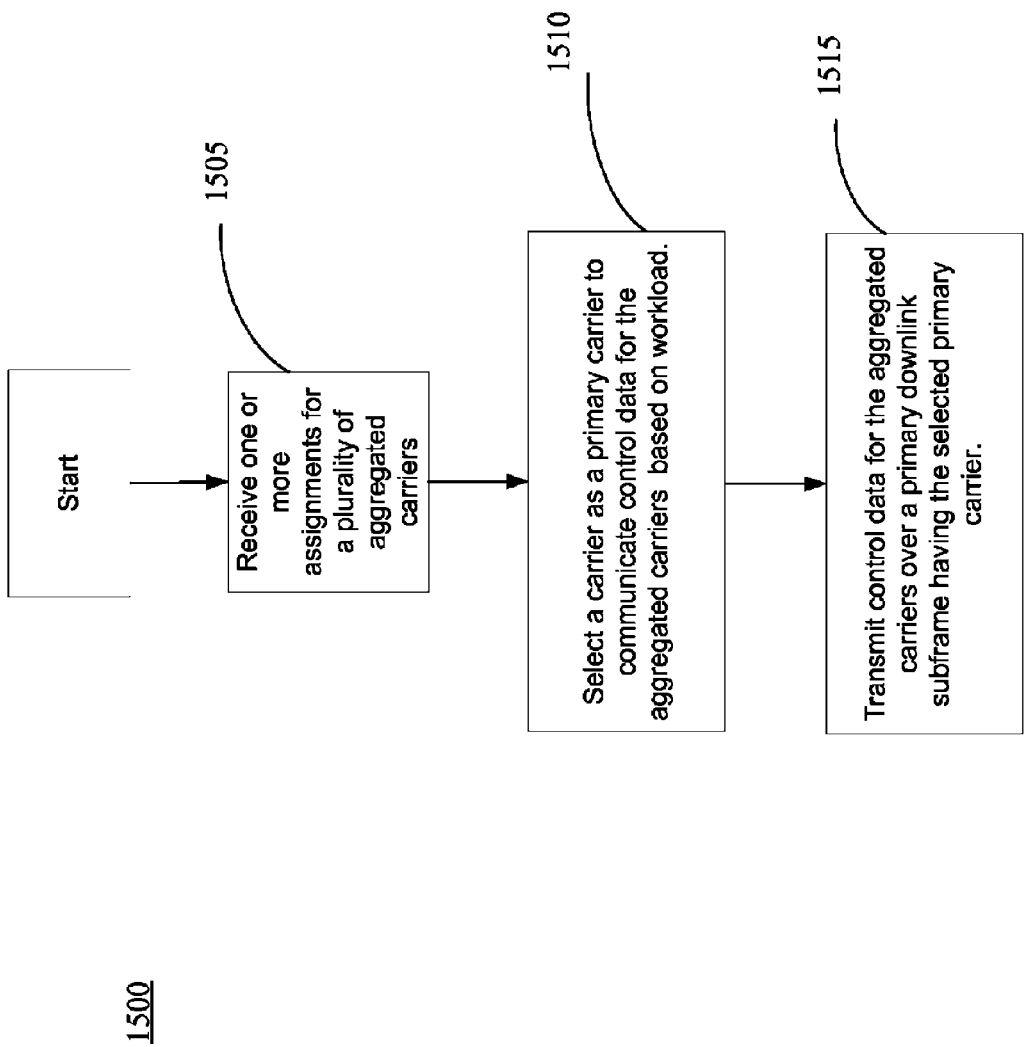
FIG. 15 is a block diagram illustrating a method for communicating control data over a PCC.

FIG. 15 illustrates an example methodology 1500 for communicating control data for multiple carriers. At 1505, one or more assignments for a plurality of aggregated carriers can be received. At 1510, a carrier can be selected as a primary carrier to communicate control data for the aggregated carriers based on a workload. For example, the workload can be determined for each carrier, and a carrier with a lowest workload or a workload that is lowest respective to a threshold level can be used for the control data. This can vary per frame and/or per type of carrier, for example. At 1515, then, control data for the aggregated carriers can be transmitted over a PDS having the selected primary carrier.

Figure 16:
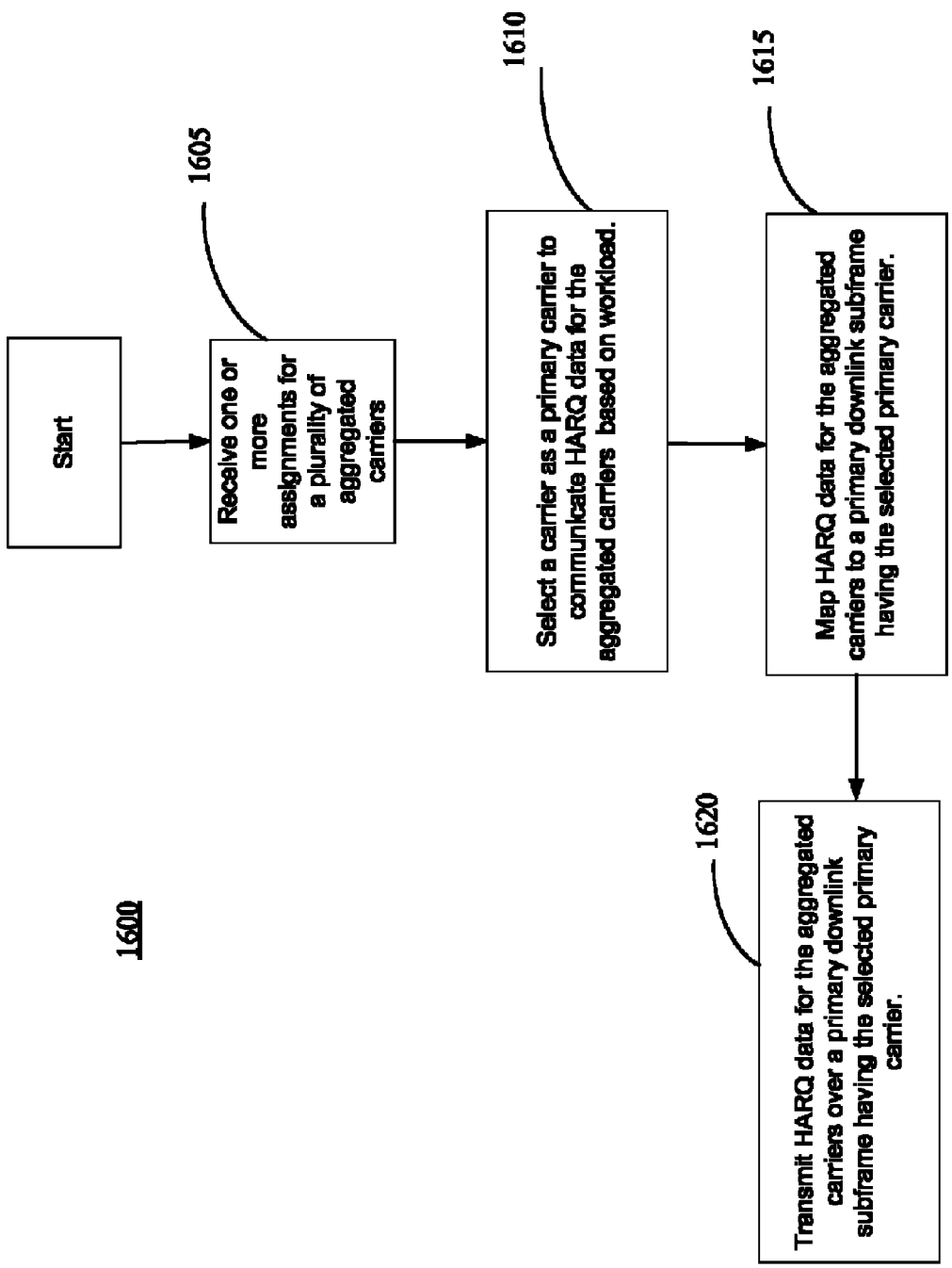
FIG. 16 is a block diagram illustrating a method for mapping retransmission feedback data to a primary downlink subframe.

FIG. 16 illustrates an example methodology 1600 for communicating control data for aggregated carriers. At 1605, one or more assignments for a plurality of aggregated carriers can be received. At 1610, a carrier can be selected as a primary carrier to communicate HARQ data for the aggregated carriers based on a workload. For example, the workload can be determined for each carrier, and a carrier with a lowest workload or a workload that is lowest respective to a threshold level can be used for the control data. This can vary per frame and/or per type of carrier, for example. At 1615, HARQ data for the aggregated carrier can be mapped to a PDS having the selected primary carrier. At 1620, HARQ data for the aggregated carriers can be transmitted over a PDS having the selected primary carrier.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communicating control information for aggregated carriers, comprising:
    receiving one or more assignments for a plurality of aggregated carriers, wherein at least one of the plurality of aggregated carriers is a time division duplexing (TDD) carrier having a different subframe configuration than at least another one of the plurality of aggregated carriers;
    determining one of the plurality of aggregated carriers over which to communicate control information for the plurality of aggregated carriers based at least in part on a subframe availability of the plurality of aggregated carriers; and
    communicating via at least one subframe the control information for the plurality of aggregated carriers over the determined one of the plurality of aggregated carriers.

2. The method of claim 1, wherein the determining the one of the plurality of aggregated carriers comprises:
    determining whether a carrier in the plurality of aggregated carriers includes uplink subframes that are a superset of additional uplink subframes of remaining carriers in the plurality of aggregated carriers; and
    selecting the carrier as the one of the plurality of aggregated carriers over which to communicate the control information upon a determination that the carrier includes the uplink subframes.

3. The method of claim 2, wherein the plurality of aggregated carriers also comprises at least one frequency division duplexing (FDD) carrier.

4. The method of claim 3, wherein the determining the one of the plurality of aggregated carriers comprises selecting the at least one FDD carrier as the one of the plurality of aggregated carriers over which to communicate the control information.

5. The method of claim 4, further comprising receiving a downlink assignment index that comprises a number of downlink transmissions received in a subframe.

6. The method of claim 1, wherein the determining the one of the plurality of aggregated carriers comprises:
    determining whether a carrier in the plurality of aggregated carriers is available for uplink transmissions during the at least one subframe; and
    selecting the carrier as the one of the plurality of aggregated carriers over which to communicate the control information upon a determination that the carrier is available for uplink transmission.

7. The method of claim 6, wherein the determining the one of the plurality of aggregated carriers further comprises determining whether remaining carriers of the plurality of aggregated carriers are available for uplink transmissions during the at least one subframe.

8. The method of claim 7, wherein the determining the one of the plurality of aggregated carriers is based at least in part on a received indication and/or instructions for selecting the one of the plurality of aggregated carriers over the remaining carriers that are available for uplink transmissions during the at least one subframe.

9. The method of claim 7, wherein the determining the one of the plurality of aggregated carriers is further based at least in part on comparing a priority or index of each carrier of the plurality of aggregated carriers.

10. The method of claim 1, wherein the determining the one of the plurality of aggregated carriers is further based on a radio resource configuration.

11. The method of claim 1, wherein the determining the one of the plurality of aggregated carriers is further based on a workload.

12. The method of claim 1, further comprising mapping HARQ data for the plurality of aggregated carriers to the determined one of the plurality of aggregated carriers.

13. The method of claim 6, further comprising determining another one of the plurality of aggregated carriers over which to communicate the control information in the at least one subframe, wherein the determining the another one of the plurality of aggregated carriers comprises:
    determining whether a first carrier in the plurality of aggregated carriers is available for downlink transmissions during the at least one subframe; and
    selecting the first carrier as the another one of the plurality of aggregated carriers over which to communicate the control information upon a determination that the first carrier is available for downlink transmission.

14. The method of claim 13, wherein the determined one of the plurality of aggregated carriers available for uplink transmissions is different from the determined another one of the plurality of aggregated carriers available for downlink transmissions.

15. The method of claim 13, wherein the at least one subframe comprises at least two subframes, the determining the one of the plurality of aggregated carriers comprises determining for communication in a first subframe, and the determining the another one of the plurality of aggregated carriers comprises determining for communication in a second subframe.

16. An apparatus for communicating control information for aggregated carriers, comprising:
- means for receiving one or more assignments for a plurality of aggregated carriers, wherein at least one of the plurality of aggregated carriers is a time division duplexing (TDD) carrier having a different subframe configuration than at least another one of the plurality of aggregated carriers;
- means for determining one of the plurality of aggregated carriers over which to communicate the control information for the plurality of aggregated carriers based at least in part on a subframe availability of the plurality of aggregated carriers; and
- means for communicating via at least one subframe the control information for the plurality of aggregated carriers over the determined one of the plurality of aggregated carriers.

17. The apparatus of claim 16, wherein the means for determining the one of the plurality of aggregated carriers is configured to:
- determine whether a first carrier in the plurality of aggregated carriers includes uplink subframes that are a superset of additional uplink subframes of remaining carriers in the plurality of aggregated carriers; and
- select the first carrier as the one of the plurality of aggregated carriers over which to communicate the control information upon a determination that the first carrier includes the uplink subframes.

18. The apparatus of claim 17, wherein the plurality of aggregated carriers comprises at least one frequency division duplexing (FDD) carrier.

19. The apparatus of claim 18, wherein the means for determining the one of the plurality of aggregated carriers is configured to select the at least one FDD carrier as the one of the plurality of aggregated carriers over which to communicate the control information.

20. The apparatus of claim 19, wherein the means for receiving is configured to receive a downlink assignment index that comprises a number of downlink transmissions received in a subframe.

21. The apparatus of claim 16, wherein the means for determining the one of the plurality of aggregated carriers is configured to:
- determine whether a first carrier in the plurality of aggregated carriers is available for uplink transmissions during the at least one subframe; and
- select the first carrier as the one of the plurality of aggregated carriers over which to communicate the control information upon a determination that the first carrier is available for uplink transmission.

22. The apparatus of claim 21, wherein the means for determining the one of the plurality of aggregated carriers is configured to determine further based at least in part on whether remaining carriers of the plurality of aggregated carriers are available for uplink transmissions during the at least one subframe.

23. The apparatus of claim 22, wherein the means for determining the one of the plurality of aggregated carriers is configured to determined further based at least in part on a received indication and/or instruction for selecting the one of the plurality of aggregated carriers over the remaining carriers that are available for uplink transmissions during the at least one subframe.

24. The apparatus of claim 22, wherein the means for determining the one of the plurality of aggregated carriers is configured to further determine at least in part by comparing a priority or index of each carrier of the plurality of aggregated carriers.

25. The apparatus of claim 16, wherein the means for determining the one of the plurality of aggregated carriers is configured to determine further based on a radio resource configuration.

26. The apparatus of claim 16, wherein the means for determining the one of the plurality of aggregated carriers is configured to determine further based on a workload.

27. The apparatus of claim 16, further comprising means for mapping HARQ data for the plurality of aggregated carriers to the determined one of the plurality of aggregated carriers.

28. The apparatus of claim 21, further comprising means for determining another one of the plurality of aggregated carriers over which to communicate the control information in the at least one subframe, wherein the means for determining the another one of the plurality of aggregated carriers is configure to:
- determine whether a first carrier in the plurality of aggregated carriers is available for downlink transmissions during the at least one subframe; and
- select the first carrier as the another one of the plurality of aggregated carriers over which to communicate the control information upon a determination that the first carrier is available for downlink transmission.

29. The apparatus of claim 28, wherein the determined one of the plurality of aggregated carriers available for uplink transmissions is different from the determined another one of the plurality of aggregated carriers available for downlink transmissions.

30. The apparatus of claim 28, wherein the at least one subframe comprises at least two subframes, the means for determining the one of the plurality of aggregated carriers is configured to determine for communication in a first subframe, and the means for determining the another one of the plurality of aggregated carriers is configured to determine for communication in a second subframe.

31. A non-transitory computer readable storage medium comprising:
- code for causing a computer to receive one or more assignments for a plurality of aggregated carriers, wherein at least one of the plurality of aggregated carriers is a time division duplexing (TDD) carrier having a different subframe configuration than at least another one of the plurality of aggregated carriers;
- code for causing the computer to determine one of the plurality of aggregated carriers over which to communicate control information for the plurality of aggregated carriers based at least in part on a subframe availability of the plurality of aggregated carriers; and
- code for causing the computer to communicate via at least one subframe the control information for the plurality of aggregated carriers over the determined one of the plurality of aggregated carriers.

32. The non-transitory computer readable storage medium of claim 31, wherein the code for causing the computer to determine the one of the plurality of aggregated carriers comprises code for causing the computer to:
- determine whether a first carrier in the plurality of aggregated carriers includes uplink subframes that are a superset of additional uplink subframes of remaining carriers in the plurality of aggregated carriers; and
- select the first carrier as the one of the plurality of aggregated carriers over which to communicate the control information upon a determination that the first carrier includes the uplink subframes.

33. The non-transitory computer readable storage medium of claim 32, wherein the plurality of aggregated carriers comprises at least one frequency division duplexing (FDD) carrier.

34. The non-transitory computer readable storage medium of claim 33, wherein the code for causing the computer to determine the one of the plurality of aggregated carriers comprises code for causing the computer to select the at least one FDD carrier as the one of the plurality of aggregated carriers over which to communicate the control information.

35. The non-transitory computer readable storage medium of claim 34, further comprising code for causing the computer to receive a downlink assignment index that comprises a number of downlink transmissions received in a subframe.

36. The non-transitory computer readable storage medium of claim 31, wherein the code for causing the computer to determine the one of the plurality of aggregated carriers comprises code for causing the computer to:
 determine whether a first carrier in the plurality of aggregated carriers is available for uplink transmissions during the at least one subframe; and
 select the first carrier as the one of the plurality of aggregated carriers over which to communicate the control information upon a determination that the first carrier is available for uplink transmission.

37. The non-transitory computer readable storage medium of claim 36, wherein the code for causing the computer to determine the one of the plurality of aggregated carriers comprises code for causing the computer to determine further based at least in part on whether remaining carriers of the plurality of aggregated carriers are available for uplink transmissions during the at least one subframe.

38. The non-transitory computer readable storage medium of claim 37, wherein the code for causing the computer to determine the one of the plurality of aggregated carriers comprises code for causing the computer to determine further based at least in part on a received indication and/or instructions for selecting the one of the plurality of aggregated carriers over the remaining carriers that are available for uplink transmissions during the at least one subframe.

39. The non-transitory computer readable storage medium of claim 37, wherein the code for causing the computer to determine the one of the plurality of aggregated carriers comprises code for causing the computer to further determine at least in part by comparing a priority or index of each carrier of the plurality of aggregated carriers.

40. The non-transitory computer readable storage medium of claim 31, wherein the code for causing the computer to determine the one of the plurality of aggregated carriers comprises code for causing the computer to determine further based on a radio resource configuration.

41. The non-transitory computer readable storage medium of claim 31, wherein the code for causing the computer to determine the one of the plurality of aggregated carriers comprises code for causing the computer to determine further based on a workload.

42. The non-transitory computer readable storage medium of claim 31, further comprising code for causing the computer to map HARQ data for the plurality of aggregated carriers to the determined one of the plurality of aggregated carriers.

43. The non-transitory computer readable storage medium of claim 36, further comprising code for causing the computer to determine another one of the plurality of aggregated carriers over which to communicate the control information in the at least one subframe, wherein the code for causing the computer to determine the another one of the plurality of aggregated carriers comprises code for causing the computer to:
 determine whether a first carrier in the plurality of aggregated carriers is available for downlink transmissions during the at least one subframe; and
 select the first carrier as the another one of the plurality of aggregated carriers over which to communicate the control information upon a determination that the first carrier is available for downlink transmission.

44. The non-transitory computer readable storage medium of claim 43, wherein the determined one of the plurality of aggregated carriers available for uplink transmissions is different from the determined another one of the plurality of aggregated carriers available for downlink transmissions.

45. The non-transitory computer readable storage medium of claim 43, wherein the at least one subframe comprises at least two subframes, the code for causing the computer to determine the one of the plurality of aggregated carriers comprises code for causing the computer to determine for communication in a first subframe, and the code for causing the computer to determine the another one of the plurality of aggregated carriers comprises code for causing the computer to determine for communication in a second subframe.

46. A user equipment (UE) for communicating control information for aggregated carriers, comprising:
 at least one processor; and
 a memory coupled to said at least one processor, wherein said at least one processor is configured to:
  receive one or more assignments for a plurality of aggregated carriers, wherein at least one of the plurality of aggregated carriers is a time division duplexing (TDD) carrier having a different subframe configuration than at least another one of the plurality of aggregated carriers;
  determine one of the plurality of aggregated carriers over which to communicate the control information for the plurality of aggregated carriers based at least in part on a subframe availability of the plurality of aggregated carriers; and
  communicate via at least one subframe the control information for the plurality of aggregated carriers over the determined one of the plurality of aggregated carriers.

47. The UE of claim 46, wherein to determine the one of the plurality of aggregated carriers comprises to:
 determine whether a first carrier in the plurality of aggregated carriers includes uplink subframes that are a superset of additional uplink subframes of remaining carriers in the plurality of aggregated carriers; and
 select the first carrier as the one of the plurality of aggregated carriers over which to communicate the control information upon a determination that the first carrier includes the uplink subframes.

48. The UE of claim 47, wherein the plurality of aggregated carriers comprises at least one frequency division duplexing (FDD) carrier.

49. The UE of claim 48, wherein to determine the one of the plurality of aggregated carriers comprises selecting the at least one FDD carrier as the one of the plurality of aggregated carriers over which to communicate the control information.

50. The UE of claim 49, wherein the at least one processor is further configured to receive a downlink assignment index that comprises a number of downlink transmissions received in a subframe.

51. The UE of claim 46, wherein to determine the one of the plurality of aggregated carriers comprises to:
   determine whether a first carrier in the plurality of aggregated carriers is available for uplink transmissions during the at least one subframe; and
   select the first carrier as the one of the plurality of aggregated carriers over which to communicate control information upon a determination that the first carrier is available for uplink transmission.

52. The UE of claim 51, wherein to determine the one of the plurality of aggregated carriers comprises to determine further based at least in part on whether remaining carriers of the plurality of aggregated carriers are available for uplink transmissions during the at least one subframe.

53. The UE of claim 52, wherein to determine the one of the plurality of aggregated carriers comprises to determine further based at least in part on a received indication and/or instructions for selecting the one of the plurality of aggregated carriers over the remaining carriers that are available for uplink transmissions during the at least one subframe.

54. The UE of claim 52, wherein to determine the one of the plurality of aggregated carriers comprises to further determine at least in part by comparing a priority or index of each carrier of the plurality of aggregated carriers.

55. The UE of claim 46, wherein to determine the one of the plurality of aggregated carriers comprises to determine further based on a radio resource configuration.

56. The UE of claim 46, wherein to determine the one of the plurality of aggregated carriers comprises to determine further based on a workload.

57. The UE of claim 46, wherein said at least one processor is further configured to map HARQ data for the plurality of aggregated carriers to the determined one of the plurality of aggregated carriers.

58. The UE of claim 51, wherein said at least one processor is further configured to determine another one of the plurality of aggregated carriers over which to communicate the control information in the at least one subframe, wherein to determine the another one of the plurality of aggregated carriers comprises to:
   determine whether a first carrier in the plurality of aggregated carriers is available for downlink transmissions during the at least one subframe; and
   select the first carrier as the another one of the plurality of aggregated carriers over which to communicate the control information upon a determination that the first carrier is available for downlink transmission.

59. The UE of claim 58, wherein the determined one of the plurality of aggregated carriers available for uplink transmissions is different from the determined another one of the plurality of aggregated carriers available for downlink transmissions.

60. The UE of claim 58, wherein the at least one subframe comprises at least two subframes, to determine the one of the plurality of aggregated carriers comprises to determine for communication in a first subframe, and to determine the another one of the plurality of aggregated carriers comprises to determine for communication in a second subframe.

61. A wireless communication device for communicating control information for aggregated carriers, comprising:
   a processor;
   memory in electronic communication with the processor; and
   instructions stored in the memory, the instructions being executable by the processor to:
      receive one or more assignments for a plurality of aggregated carriers, wherein at least one of the plurality of aggregated carriers is a time division duplexing (TDD) carrier having a different subframe configuration than at least another one of the plurality of aggregated carriers;
      determine one of the plurality of aggregated carriers over which to communicate the control information for the plurality of aggregated carriers based at least in part on a subframe availability of the plurality of aggregated carriers; and
      communicate via at least one subframe the control information for the plurality of aggregated carriers over the determined one of the plurality of aggregated carriers.

62. The wireless communication device of claim 61, wherein the instructions executable by the processor to determine the one of the plurality of aggregated carriers comprise instruction to:
   determine whether a first carrier in the plurality of aggregated carriers includes uplink subframes that are a superset of additional uplink subframes of remaining carriers in the plurality of aggregated carriers; and
   select the first carrier as the one of the plurality of aggregated carriers over which to communicate the control information upon a determination that the first carrier includes the uplink subframes.

63. The wireless communication device of claim 62, wherein the plurality of aggregated carriers comprises at least one frequency division duplexing (FDD) carrier.

64. The wireless communication device of claim 63, wherein the instructions executable by the processor to determine the one of the plurality of aggregated carriers comprises instructions to select the at least one FDD carrier as the one of the plurality of aggregated carriers over which to communicate the control information.

65. The wireless communication device of claim 64, wherein the instructions are further executable by the processor to receive a downlink assignment index that comprises a number of downlink transmissions received in a subframe.

66. The wireless communication device of claim 61, wherein the instructions executable by the processor to determine the one of the plurality of aggregated carriers comprise instructions to:
   determine whether a first carrier in the plurality of aggregated carriers is available for uplink transmissions during the at least one subframe; and
   select the first carrier as the one of the plurality of aggregated carriers over which to communicate the control information upon a determination that the first carrier is available for uplink transmission.

67. The wireless communication device of claim 66, wherein the instructions executable by the processor to determine the one of the plurality of aggregated carriers comprises instructions to determine further based at least in part on whether remaining carriers of the plurality of aggregated carriers are available for uplink transmissions during the at least one subframe.

68. The wireless communication device of claim 67, wherein the instructions executable by the processor to determine the one of the plurality of aggregated carriers comprise instructions to determine further based at least in part on a received indication and/or instructions for selecting the one of the plurality of aggregated carriers over the remaining carriers that are available for uplink transmissions during the at least one subframe.

69. The wireless communication device of claim 67, wherein the instructions executable by the processor to determine the one of the plurality of aggregated carriers comprise instructions to further determine at least in part by comparing a priority or index of the one of the plurality of aggregated carriers to the remaining carriers of the plurality of aggregated carriers.

70. The wireless communication device of claim 61, wherein the instructions executable by the processor to determine the one of the plurality of aggregated carriers comprise instructions to determine further based on a radio resource configuration.

71. The wireless communication device of claim 61, wherein the instructions executable by the processor to determine the one of the plurality of aggregated carriers comprise instructions to determine further based on a workload.

72. The wireless communication device of claim 61, wherein the instructions are further executable by the processor to map HARQ data for the plurality of aggregated carriers to the determined one of the plurality of aggregated carriers.

73. The wireless communication device of claim 66, wherein the instructions are further executable by the processor to determine another one of the plurality of aggregated carriers over which to communicate the control information in the at least one subframe, and the instructions executable by the processor to determine the another one of the plurality of aggregated carriers comprise instructions to:

determine whether a first carrier in the plurality of aggregated carriers is available for downlink transmissions during the at least one subframe; and select the first carrier as the another one of the plurality of aggregated carriers over which to communicate the control information upon a determination that the first carrier is available for downlink transmission.

74. The wireless communication device of claim 73, wherein the determined one of the plurality of aggregated carriers available for uplink transmissions is different from the determined another one of the plurality of aggregated carriers available for downlink transmissions.

75. The wireless communication device of claim 73, wherein the at least one subframe comprises at least two subframes, the instructions executable by the processor to determine the one of the plurality of aggregated carriers comprise instructions to determine for communication in a first subframe, and instructions executable by the processor to determine the another one of the plurality of aggregated carriers comprise instructions to determine for communication in a second subframe.

\* \* \* \* \*